Figure 1:
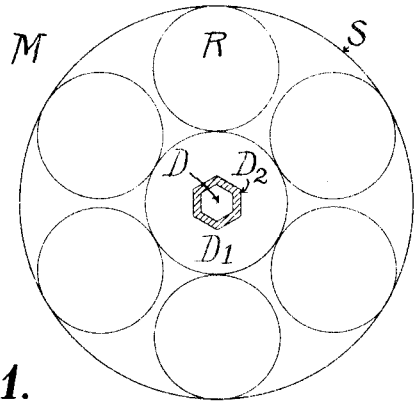

C. N. DUTTON.
POWER TRANSMISSION APPARATUS.
APPLICATION FILED AUG. 8, 1908.

1,138,094.

Patented May 4, 1915.
10 SHEETS—SHEET 1.

Witnesses
Elizabeth Dutton
Mary Dutton

Inventor
Chauncey N. Dutton

C. N. DUTTON.
POWER TRANSMISSION APPARATUS.
APPLICATION FILED AUG. 8, 1908.
1,138,094.
Patented May 4, 1915.
10 SHEETS—SHEET 3.
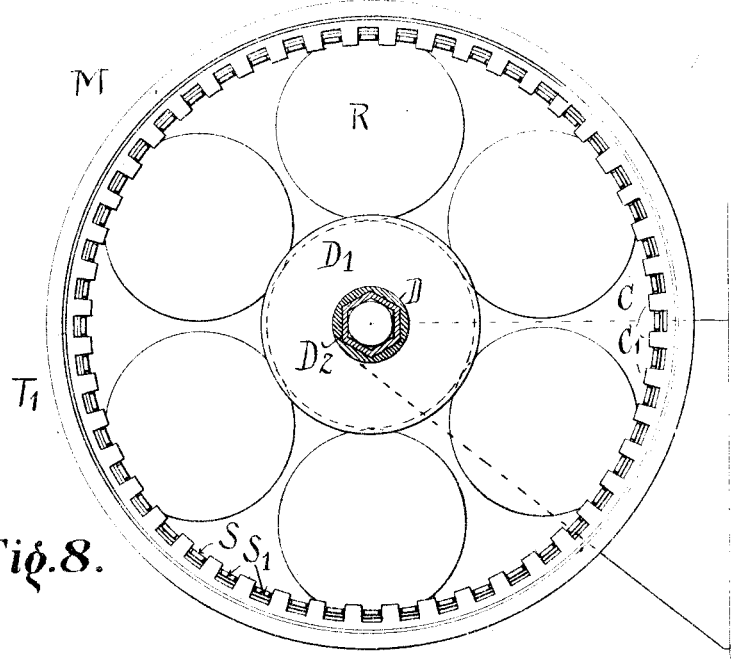
Fig. 8.
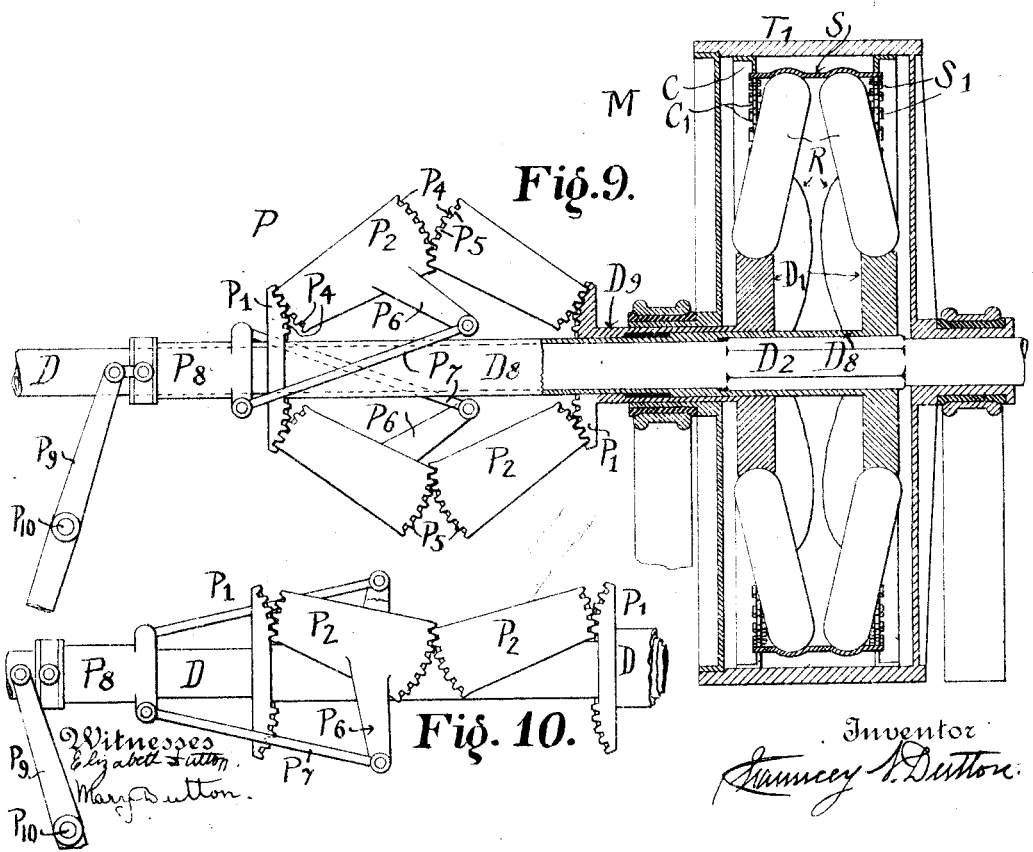
Fig. 9.
Fig. 10.
Witnesses
Elizabeth Dutton
Mary Dutton
Inventor
Chauncey N. Dutton C. N. DUTTON.
POWER TRANSMISSION APPARATUS.
APPLICATION FILED AUG. 8, 1908.
1,138,094.
Patented May 4, 1915.
10 SHEETS—SHEET 4.
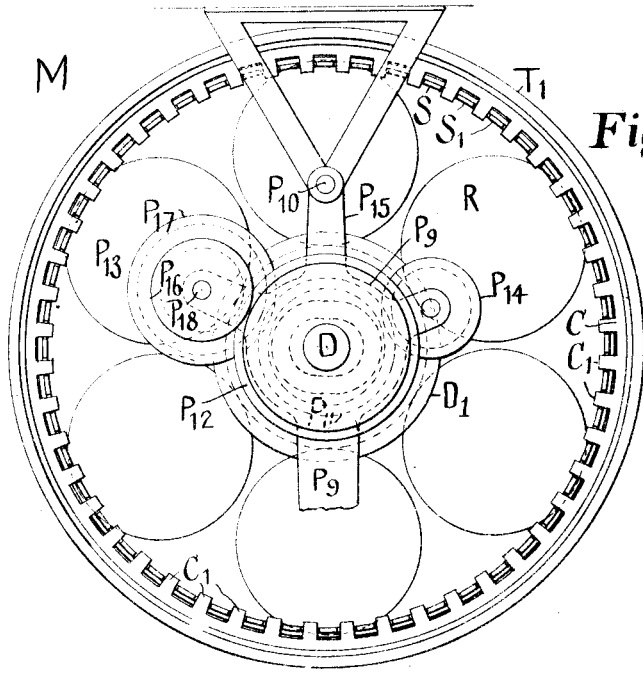
Fig. 11.
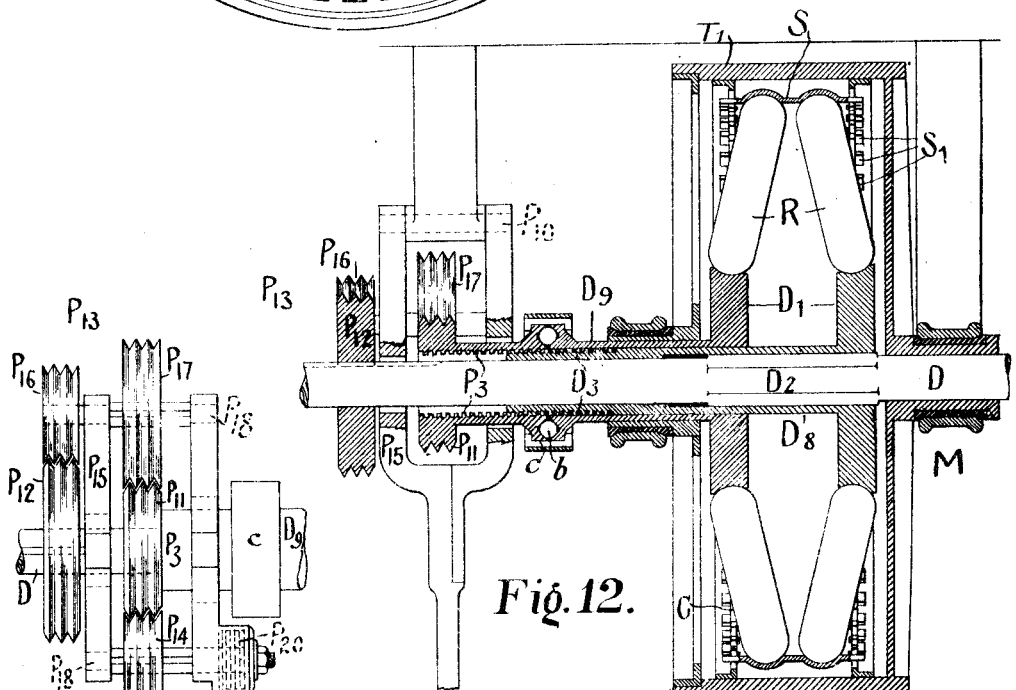
Fig. 12.
Fig. 13.
Witnesses:
Mary Dutton
Emma Dutton
Inventor
Chauncey N. Dutton

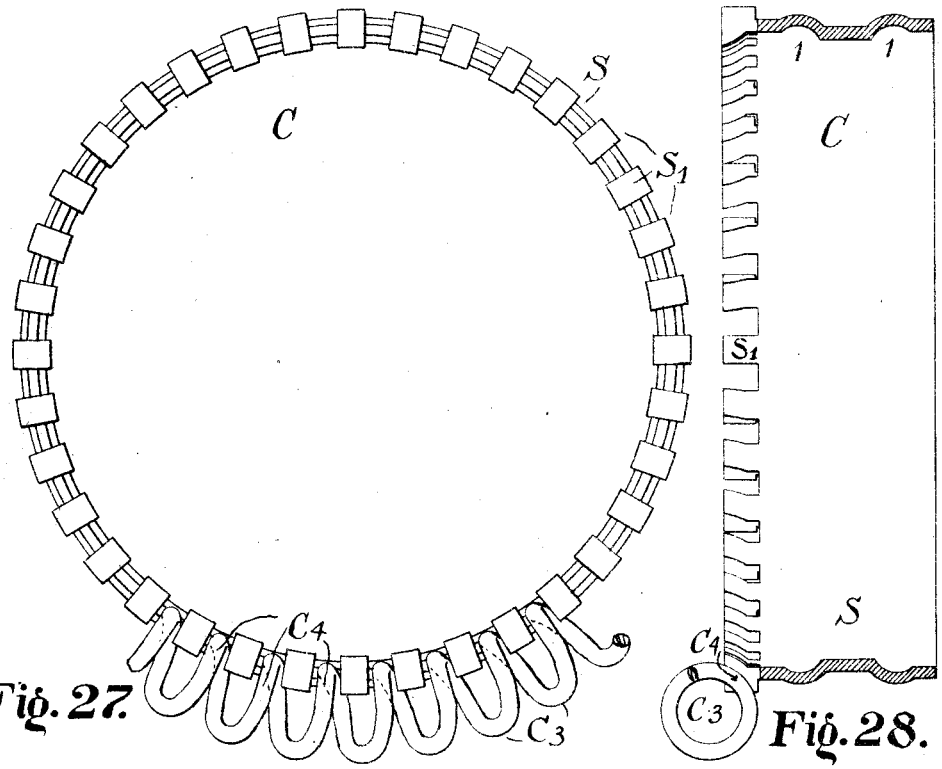
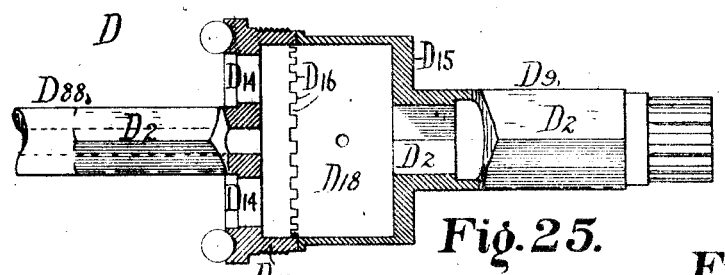
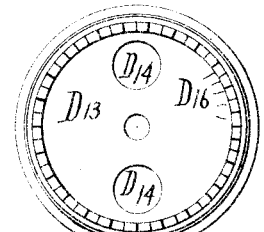
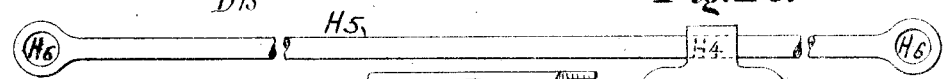
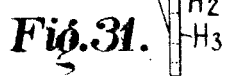
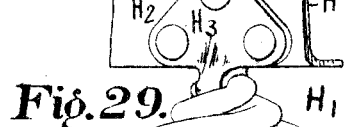

UNITED STATES PATENT OFFICE.

CHAUNCEY N. DUTTON, OF NEW YORK, N. Y.

POWER-TRANSMISSION APPARATUS.

1,138,094.  Specification of Letters Patent.  Patented May 4, 1915.

Application filed August 8, 1908. Serial No. 447,610.

*To all whom it may concern:*

Be it known that I, CHAUNCEY N. DUTTON, a citizen of the United States, and of the State of New York, residing in New York city, county and State of New York, have invented certain new and useful Improvements in Power-Transmission Apparatus, my said improvement constituting and being a clutch, transmission, and differential, and being based upon priciples not heretofore applied, so far as I am aware, to such apparatus.

The objects of my invention are to produce such apparatus which shall embody rolling members and elastic members in lieu of sliding members or members acting by sliding friction and rigid members or members rigid relatively to one another as is now the practice; to utilize the elasticity and resiliency of said members to the fullest extent and to produce such apparatus which shall be adaptable to any power transmission, however great; to any usage, however severe, and which shall automatically adjust its power delivery torque relatively to its power receiving torque so that it may receive power from a rapidly running engine or shaft, and deliver it at a high speed and small torque when the load is light and at a slow speed and greater torque when the load is heavy, automatically adjusting its delivery speed inversely and its delivery torque directly proportional thereto.

In general terms, my apparatus embodies a driving shaft and a driven shaft, driving wheels or drivers on the driving shaft, rolling members driven by said drivers, an elastic member preferably a cylindrical member enveloping the driving and rolling members and driven by them and suitably connected with the driven shaft, and means for adjusting the pressure which the driving and driven members exert upon one another, proportionally to the load and to the speed at which it is desired that the driven member shall rotate.

The driving and driven members revolve and the rolling members have an orbital motion about the axis of the driving shaft in the same direction and it necessarily follows that the rolling members intermediate between the driving and driven members float, or are free to assume angular positions dependent upon the duty they are performing at any instant.

Describing the operation of my apparatus in general terms, the pressure of the members upon one another is so adjustable and adjusted that the rolling members deform and cause shearing strains in the elastic enveloping driven member, which reacts against such strains by the resistance of its molecules to shearing. The load tends to retard the rotative speed of the driven relatively to the driving members and therefore the rolling members tend to roll upon the elastic enveloping member, to drive said nodes of strain around its body, which reacts by its resiliency against the translation, through its substance, of said nodes of strain; and such reaction is communicated to the driven shaft and tends to rotate it with a couple proportionate to the strains in the elastic enveloping member. It will be seen that in my apparatus the work of deforming and straining the members is the driving agent and useful work, instead of being wasted work, as is the case in friction drives and in fact, in all other types of drives except belts-and-pulleys toothed gearing and electrical machines.

In the preferred form of my apparatus the driving shaft is double, one part being inclosed and adapted to slide in the other and each part carries a driving wheel or driver; a double series of revolving or rolling members contact with and are driven by the driving wheels; and an elastic cylindrical member, which I shall name the "resilient" envelops the driving and revolving or rolling members and is suitably, preferably elastically connected with the driven shaft: and the two parts of the driving shaft and their respective driving wheels, are adjustable in distance from one another and combine with the rolling members and the resilient to form a toggle arrangement in which, when the drivers are approached the rollers are inclined at a greater angle with the axis of the apparatus, their outer 10 surfaces are at a greater distance from said axis and the pressure exerted between said rollers and the drivers and resilient is increased; and the strains in the resilient and its resistance to the travel of such strains 10 through its substance are likewise increased, and therefore the driving torque is increased proportionally to the distance between the drivers and directly proportional to the load or resistance and vice versa.

I will illustrate the action of my apparatus by describing it as applied to a motor vehicle. In such a vehicle the engines are necessarily small and run at a very high speed, 1,000 to 2,000 revolutions per minute and transmit energy in very small amounts per engine revolution, to the vehicle wheels.

The vehicle wheels may have to run at one instant, at engine speed and the energy transmitted to them per revolution in such case is very small; as when the vehicle is running on a good and level road; and suddenly when the vehicle strikes a grade or a piece of bad road, its wheels may be compelled to slow down to a small per cent of the normal revolutions. In the first case the torque delivered to the vehicle wheels per revolution thereof is engine torque minus friction; and in the second case it should be many times normal torque. My apparatus will accomplish this variation of torque per revolution of the vehicle or driven wheels automatically in many cases and in any case, however severe, by a small adjustment of the distance between the drivers. It will be understood that the total engine power must be varied to said road resistances, as is commonly done, as otherwise the vehicle would race, or stall, instead of traveling at a desired speed.

When running at high speed the driving shaft, rollers, resilient, driven shafts and wheels run synchronously, as one piece; and when the vehicle strikes a grade or bad piece of road and the load or resistance is increased, the rollers roll between the drivers and the resilient, the revolutions of which slow down inversely proportional to the load or resistance and the transmission torque increases directly proportional thereto.

The apparatus functions in consonance with certain mathematical and physical laws, the latter not heretofore made useful in the arts. The former will be set forth particularly; the latter only approximately because inventor's experiments have not been sufficiently numerous, exhaustive and precise for comprehensive and precise knowledge of the subject. The mathematical laws applying to the resilient are as follows:—When free from strain it is a cylindrical tube, with the rollers symmetrically located, in contact with its inner surface. Pressure applied to it by means of the rollers changes it toward and to a polygonal tube with rounded corners. In consonance with the laws of polygons, this change in form takes place with substantially no change in the relative lengths of the circumferential laminæ, which, under all circumstances, are proportional to their respective radii. But while all the laminæ remain substantially unchanged in relative circumferential lengths, they are subject to as many graduated strains, and to twice as many graduations of strains, as there are rollers; the same radial planes cut the axis of maximum strain in the inner and minimum strain in the outer laminæ, and vice versa; and the laminæ tend to move circumferentially, locally, relatively to one another.

There is no "bending," as that term is used in physics, to characterize proportional extension and compression of fibers or laminæ to opposite sides of a neutral (in this case circumferential) axis. There is no "bending" because there is no compression other than the distending and strain-conjugating pressures at the roller contacts. Instead of the areas of graduated compression and extension of "bending," there are nodes and areas of graduated tensions and of shears conjugating and in equilibrium with the same.

The tension is maximum in the outer and minimum in the inner laminæ at the radical planes pressing through the roller axes, and minimum in the outer and maximum in the inner laminæ mid-way between the rollers. The shears are nil at the same planes and conjugate the graduated tensions, as must be evident to those who have studied elastic strains and reactions. Nearly the whole volume of the resilient is in graduated shear and substantially one half of its elastic resistance to, and of its resiliency under shear are utilized, thus making it a more economical instrument than a helical spring.

If the system of distending rollers be revolved and the resilient retarded relatively thereto, the rollers will roll on, and drive said areas of strain around in, the resilient, which, with its resiliency, resists such translations of strain among its molecules, with a force varying relatively to the speed of such translation, but in a mode not yet experimentally determined, somewhat as a pipe resists flow of liquid through its bore, or magnetic fields resist translation of metal bodies across them.

Rollers are ideal converters of small, swift forces into large, slow-moving ones; and their capacity to intensify force is limited only by the resistance thereto; because, considered as levers, they receive power at the ends of arms equal to their diameter and deliver it upon the resilient by arms almost infinitesimally short.

In its essence, the invention comprises a series of power-driven, stress-intensifying rollers coacting with a resilient, automatically-proportionating, power-delivering, movable abutment. The rollers are distended to strain the resilient substantially (within certain rather wide limits) proportionately to the resistance and the desired rate of speed; when revolved, they tend to intensify to a limit, it may be to infinity, and to so deliver upon the resilient, the stress applied to themselves; but the molecular reactions in the resilient cause it to set a limit to such intensification and (within its own limits of action) to proportionate the speed of stress delivery to the resistance and the power supply.

Such apparatus is described in the following specification and illustrated in the accompanying drawings, in which—

Figure 2:
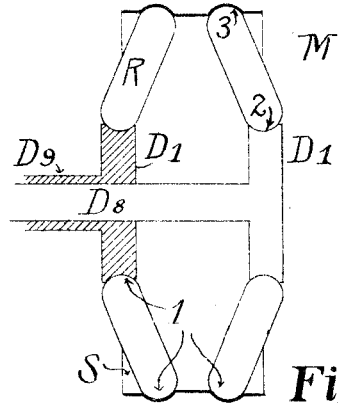
Figure 3:
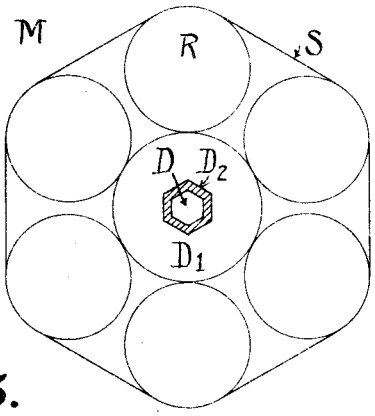
Figure 4:
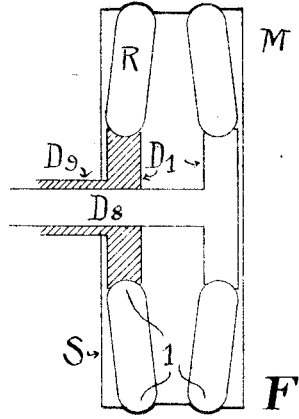
Figure 5:
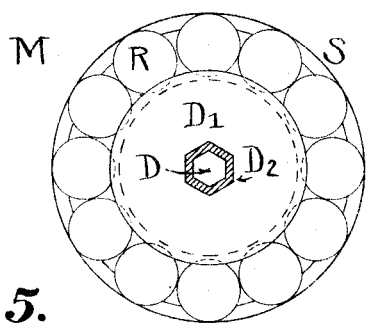
Figure 18:
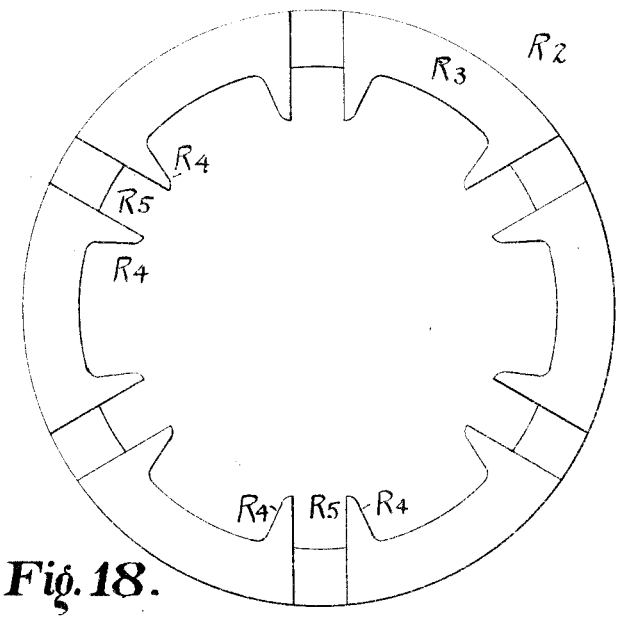
Figure 19:
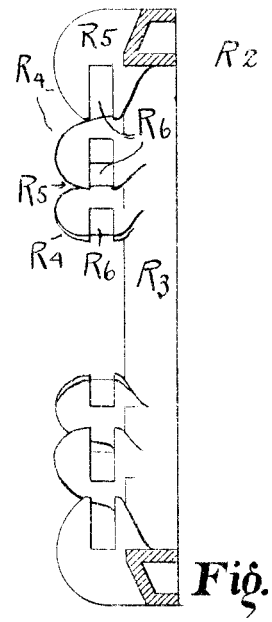
Figures 20, 21:
Figure 22:
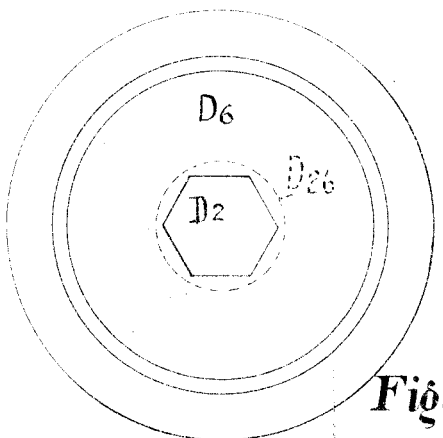
Figure 24:
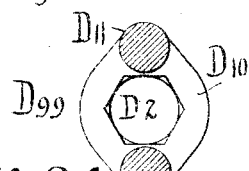
Figure 23:
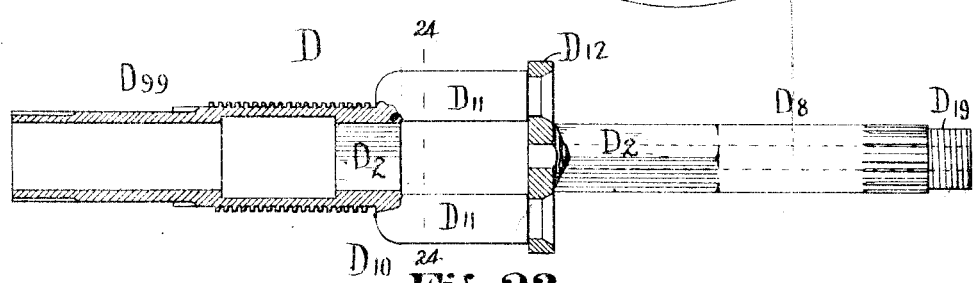

Figures 1. to 7. inclusive are diagrammatic views, Fig. 1. being a face or front view and Fig. 2. a section of the preferred form of apparatus in which the rolling members are disks or wheels; Fig. 3. a similar face view and Fig. 4. a similar section showing conditions of maximum strain; Figs. 5. and 6. a similar face view and section of an apparatus in which the rolling members are balls, and Fig. 7. a diagrammatic section of an apparatus especially adapted to drive a motor vehicle, and shows my double, cross connected, oppositely movable shaft sections carrying two such apparatuses, one for each wheel of the vehicle and constituting in and of itself, clutch, transmission and differential mechanism. Figs. 8, 9 and 10 illustrate my apparatus as a hand thrown clutch for light transmission, Fig. 8 being a face view, Fig. 9 a section and 10 a view of the pressure adjusting apparatus. Figs. 11, 12 and 13 illustrate my apparatus as a power-operated clutch, suitable for very heavy work, Fig. 11 being a face view, Fig. 12 a section and Fig. 13 a view of the power-operated pressure adjusting apparatus. Figs. 14 to 31.inclusive show my apparatus as applicable to a motor vehicle, Fig. 14 being a horizontal section on the line 14—14 of Figs. 15 and 16, Fig. 15 a section on the line 15—15 of Figs. 14, 16 and 17, Fig. 16 a section on the line 16—16 of Figs. 14, 15 and 17, and Fig. 17 a section on the line 17—17 of Figs. 15 and 16. Fig. 18 is an elevation and Fig. 19. a central section of a ring for spacing the rolling members. Fig. 20 is an elevation and Fig. 21 a central section of the guide blocks of the rolling members. Fig. 22 is an elevation of the driven bevel gear. Fig. 23 is a view partly in section of one member of my double, crossed, sliding shaft and Fig. 24 is a section of same on line 24—24 of Fig. 23. Fig. 25 is a view partly in section of the other part of my double shaft and Fig. 26 a front view of the crab uniting the parts thereof. Fig. 27 is a front view of my enveloping member or "resilient" and Fig. 28 a central section thereof. Fig. 29 is a view of an improved spring for supporting the vehicle elastically on my apparatus, Fig. 30 a view of the bar of which said spring is wound and Fig. 31 a side view of the attachment by which it is connected to the chassis of the vehicle.

In the practice of my invention I provide a power transmission apparatus, clutch and differential generally indicated by M, to which power may be supplied by a driving shaft D, running at any speed and torque; and which with proper adjustment of its internally-contained strains will automatically deliver said power, minus friction, to a driven shaft T, at a speed inversely proportional to the resistance or load of the driven shaft with a torque directly proportional thereto.

The driving shaft D carries driving wheels or drivers $D^1$. Revolving or rolling members R, in contact with the drivers $D^1$ and adapted to be driven by them, are interposed between said drivers and an elastic member S, which I term the "resilient"; and pressure is exerted between the drivers, the rollers and the resilient and when the drivers are rotated they drive the rollers and the resilient and a power delivery or driven shaft T, suitably connected therewith by a connecting device C. The rolling members R are angularly unconfined save that they are mechanically spaced or separated so as not to rub on one another and their positions, at any instant, depend solely on the duty they may be doing.

Figure 6:
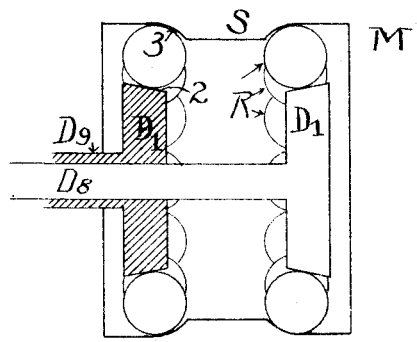

The power of the drive is proportional to the pressure exerted between the members; and I provide pressure-adjusting apparatus P, by which said pressure can be adjusted at the will of the operator. As illustrated in the diagrams, Figs. 1 to 7 inclusive, I prefer to make the driving shaft in two parts, a female part $D^9$ enveloping a male part $D^8$, which has a sliding motion in the female part, controlled by the pressure adjusting apparatus P; to secure a driver $D^1$ on each of said shaft members $D^8$ and $D^9$; to make my resilient, S, an elastic cylindrical enveloping member; to make the rollers, R, disks of considerable diameter relatively to their thickness and to insure that said parts retain their proper relations by rounding the edges of the rollers, R, and making corresponding grooves 1, best shown in Fig. 28 in the drivers $D^1$ and resilient S. This arrangement however, may be changed without departing from the scope of my invention, the general idea of which is a drive by rolling members abutting on drivers and acting on a resilient member, driving by the elastic resistance of said resilient to the passage of strains through its substance. For example, on Figs. 5 and 6 I show the rollers R. as balls; in which case the drivers preferably have opposed conical driving faces 2, and the opposed faces 3 of the resilient S. are preferably curved to a radius somewhat larger than the radius of the balls.

Obviously many forms of rollers or revolving member and of driving faces on the drivers $D^1$ and resilient S can be used. I might even use wheels revolving on journals carried in a frame or spider and outwardly adjustable but such an arrangement is manifestly inferior.

The combination should be such that the pressure between the drivers, rollers and resilient is obtained with the least possible applying stress; and members embodying the toggle principle do this in a very effective and satisfactory manner. It is also necessary that the pressure be contained within the functioning members and not exerted between revolving and non-revolving members, in which case it would have brake action. This is most easily avoided with apparatus acting on the toggle principle. The contrast between Figs. 1 and 2 and Figs. 3 and 4, illustrates the toggle action of the rollers. It is obvious also from inspection of Figs. 5 and 6 that toggle action can be obtained with balls as rollers by suitably inclining the driving and driven faces.

I may use my apparatus for a clutch to connect and disconnect a driving revolving member with and from a driven revolving member, for example, to connect and disconnect a driving shaft and pulley. Such uses are illustrated in Figs. 8 to 13 inclusive, Figs. 8, 9 and 10 illustrating a pulley for light transmission and Figs. 11, 12 and 13 a pulley for heavy transmission.

For light transmission the pressure adjusting apparatus P can be hand operated. Such apparatus is shown in Figs. 8, 9 and 10 in which I show a pulley $T^1$ suitably mounted in bearings and adapted to be clutched to and released from a main driving shaft D by my apparatus M. The male part $D^8$ of the driving shaft envelops it and is in turn enveloped by the female part $D^9$ and both said parts can be moved longitudinally relatively to one another by the pressure adjusting apparatus P, while their revolutions are synchronized by closely fitting polygonal or prismatic sections $D^2$. The male part $D^8$ of the shaft carries a driver $D^1$ as also does the female part $D^9$, and a set of rollers, R, is interposed between each of said drivers $D^1$ and a resilient S, which is suitably connected with the pulley $T^1$ by a connection C, in this instance shown as a form of crab, teeth $S^1$ being formed on the resilient S, which teeth engage notches, $C^1$ formed on the pulley. The pressure apparatus P, shown in these figures is a form of toggle, abutments, $P^1$, for which are provided on the male part of $D^8$ and female part $D^9$ of the shaft. As the pressures necessary even in light driving preclude the use of pin bearings for the toggles $P^2$, they and their abutments $P^1$ have rolling surfaces $P^4$ and spur gearings, $P^5$ to insure their proper action. A toggle of each pair has an arm $P^6$, link and pin connected by a link $P^7$ with a sliding collar $P^8$ on the shaft D, and said collar can be thrown by a hand lever $P^9$ pivoted on a fixed fulcrum $P^{10}$. When said lever is thrown to the right, the position shown in Fig. 10, the drivers $D^1$, are approached and the rollers R, are forced out against the resilient S, increasing the strains therein and setting the clutch; which may be released by returning the lever to the left, the position shown in Fig 9, which motion separates the drivers $D^1$ and reduces the strains in the resilient S.

For very heavy driving hand-operated pressure-regulating apparatus P, would be inadequate and I therefore show, in Figs. 11, 12 and 13 pressure apparatus P merely hand-controlled, operated by the power of the main driving shaft D. The relation of the main driving shaft, D, its male and female parts, $D^8$ and $D^9$, the rollers R, resilient S, pulley $T^1$ and connection C, are the same as above described.

For setting and releasing my apparatus M, the pressure adjusting apparatus P, consists in a screw $D^3$ formed on one, preferably the male part $D^8$ of the shaft D, and a nut $P^3$ engaging therewith abutting at one end against the female shaft part $D^9$ preferably by a ball thrust bearing $b$, and also swiveled thereon by the engagement of its head with a corresponding groove formed in an engaging collar $c$, so that the female part $D^9$ and male part $D^8$ are adjusted in relative positions by the screw $D^3$ and nut $P^3$. The pitch of the screw $D^3$ is such that the nut will not back off except by the application of force to it, and to move the nut on the screw I provide a friction wheel $P^{11}$ on the nut $P^3$, a friction drive wheel $P^{12}$ on the shaft, a setting up friction train $P^{13}$ and a releasing friction wheel $P^{14}$ both of which trains are journaled in a swinging frame $P^{15}$ pivoted on a fixed fulcrum $P^{10}$ and having a hand lever $P^9$. The setting up train $P^{13}$ consists in a primary wheel $P^{16}$ and a secondary wheel $P^{17}$ fixed on a journal $P^{18}$ rotatable in bearings in the frame $P^{15}$. The releasing wheel, $P^{14}$ is fixed on a journal $P^{19}$ and its frictional resistance to rotation is adjustable by a disk clutch $P^{20}$ or other suitable device.

When the frame $P^{15}$ is in its neutral or central position as shown in Fig. 11 the friction trains do not mesh and the relative positions of the screw $D^3$ and nut $P^3$ and of the drivers $D^1$, and the consequent strains in the resilient S, remain unchanged. When the frame $P^{15}$ is swung to the right the setting-up train $P^{13}$ acts, the driver $P^{12}$ on the shaft D engaging the primary $P^{16}$ and the secondary, $P^{17}$, of said train $P^{13}$ engaging the wheel $P^{11}$ on the nut $P^3$, which is rotated positively or forwardly relatively to the screw $D^3$, approaching the drivers $D^1$ and setting up the apparatus M. When the frame $P^{15}$ is swung to the left the releasing wheel $P^{14}$ engages the wheel $P^{11}$ on the nut $P^3$ and the frictional resistance of the clutch $P^{19}$ on the shaft $P^{10}$ causes the releasing wheel $P^{14}$ to hold the nut $P^3$ back relatively to the rotation of the shaft D and to unscrew said nut $P^3$ on the screw $D^3$, separate the drivers D, and release the apparatus M.

My apparatus M was primarily designed for use on motor vehicles and the remaining drawings, Figs. 14 to 31 inclusive, show it so applied. The proper location for it, in such a vehicle, is in the driving axle, usually the rear axle. I therefore show an axle A, adapted to contain and support my apparatus M. Said axle A is preferably made in 3 parts, to wit: a central section $A^1$ preferably a steel tube of large bore, closed by heads $A^2$ screwed and pinned to the central section $A^1$ and having tubular extensions $A^3$ through which the wheel shafts $T^w$ can extend to the wheels W.

In order to properly support my driving gear train $D^4$, driving shaft D and adjusting apparatus P in the axle A, I provide a split cylindrical assembling frame or case $A^4$ fitting in and pinned or otherwise secured substantially centrally in the central section $A^2$ of the axle A. Said case $A^4$ is divided substantially horizontally into a base, $A^5$ and cap $A^6$, united by a flanged joint $A^7$ and has circumferential end flanges $A^8$ for fitting and securing it in the axle section $A^1$, ribbed heads $A^9$ axial bearings $A^{10}$ for the driving shaft D, a transverse bearing $A^{11}$, substantially at right angles to the axis, for the propeller shaft connection, said transverse bearing $A^{11}$ being formed in and supported by a vertical, longitudinal wall $A^{12}$, substantially horizontal seats, $A^{13}$ for conveniently attaching frames which directly support parts of the apparatus, boss, $A^{14}$, pockets, $A^{15}$ a hand hole $A^{16}$ and outside the vertical longitudinal wall $A^{12}$ an oil pocket $A^{17}$.

Power is brought from the engine to my apparatus M, by a propeller shaft $D^7$ (or in other suitable manner) to facilitate the connection of which I make an opening $A^{18}$ in the axle section $A^1$, axial with the transverse bearing $A^{11}$. I attach a flanged coupling $A^{19}$ to the axle section $A^1$ enveloping the opening $A^{18}$ and a tubular case $A^{20}$ to the coupling $A^{19}$, which case incloses the propeller shaft $D^7$. The driving shaft D of my apparatus M extends through the axial bearings $A^{10}$. The pressure adjusting apparatus P is contained in the case $A^4$, and at each end of the central axle section $A^1$ between a head $A^2$ and the case $A^4$ is a drive part $M^1$ of my apparatus M, one for each vehicle wheel, each such drive part $M^1$ consisting of a pair of drivers $D^1$, $D^1$, a resilient S, two sets of rollers R. R. and a connection C, connecting such drive apparatus with a head $T^2$ on a wheel shaft $T^w$, said shaft extending outwardly through a tubular extension $A^3$ of the axle head $A^2$ to a wheel W.

Because the drive parts $M^1$, $M^1$ of my apparatus are double and in order to operate them both with one pressure-adjusting apparatus P, I provide two female parts $D^9$, $D^{99}$ of the shaft D, and two male parts $D^8$, $D^{88}$ also and cross connect the shaft members, connecting the right hand male part $D^8$ with the left hand female part $D^{99}$ and the left hand male part $D^{88}$ with the right hand female part $D^9$ and secure the outer drivers $D^1$ of each pair to a male part $D^8$, $D^{88}$ and the inner drivers $D^1$ of each pair to a female part $D^9$, $D^{99}$. This is most clearly shown in Fig. 7, in which the connected left hand outer driver $D^1$ its connected male part $D^{88}$ of the shaft, the female part $D^9$ on the right hand side and the driver $D^1$ connected therewith are drawn in light lines, hatched and shaded; while the left hand inner driver $D^1$, its connected female part $D^{99}$, the connected right hand male part $D^8$ and its outer right hand driver $D^1$ are drawn and shade-lined with heavy lines.

Figure 7:
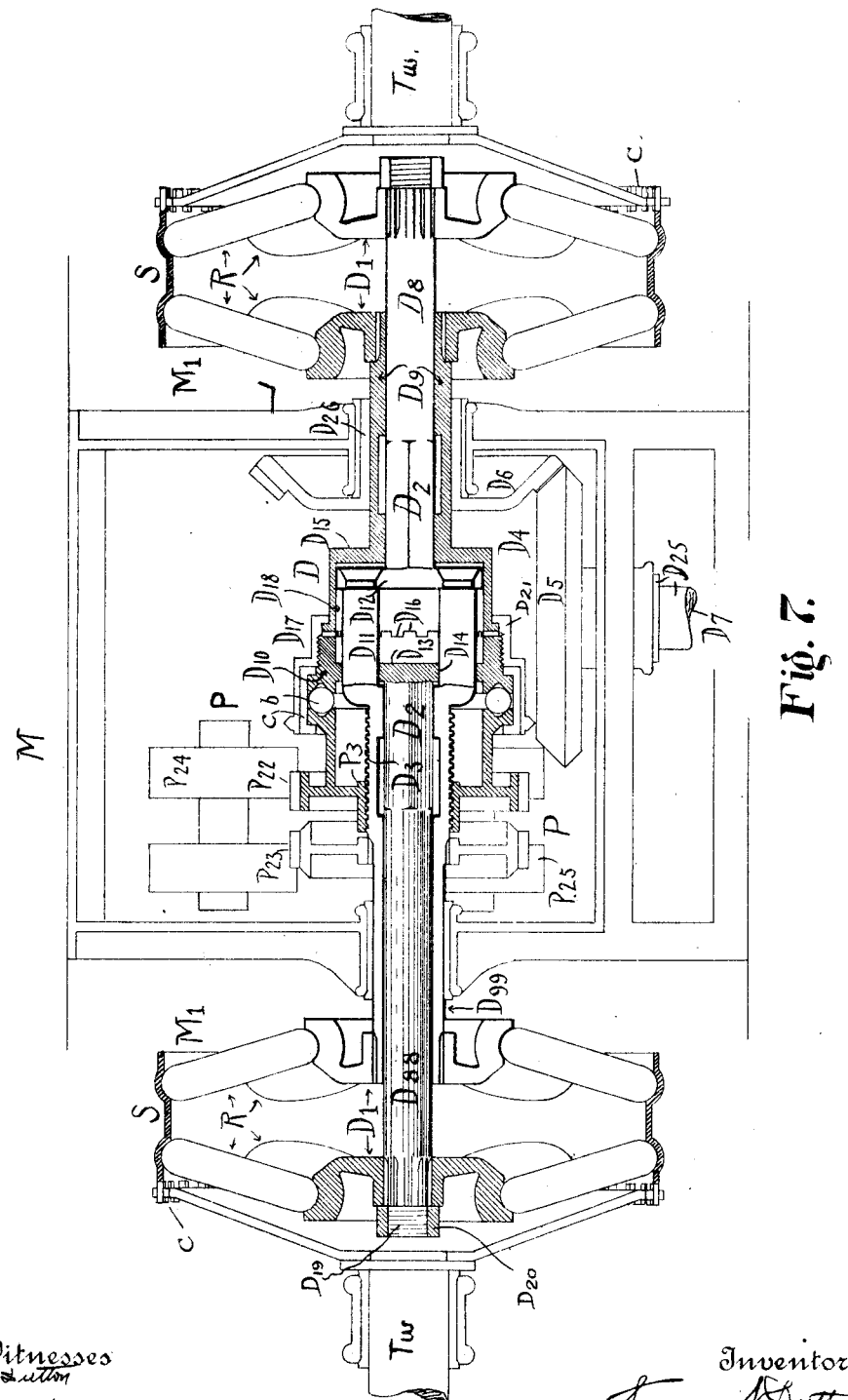

This construction gives the desired pressure-adjusting motions to the drivers $D^1$ of each pair in equal degrees with a single pressure-adjusting apparatus P, for in order to increase the pressure and strains in the resilient S, it is necessary that the drivers $D^1$ of each pair approach one another; that is to say, the outer drivers must move inwardly and the inner drivers outwardly; and vice versa for releasing. As constructed, when the right hand outer driver $D^1$ moves to the left the left hand inner driver also moves to the left; and at the same time the left hand outer driver moves to the right and the right hand inner driver also moves to the right; and the drivers $D^1$, $D^1$ of each pair approach one another and vice versa. To this end as best shown in Figs. 7, 14 and 22 to 26 inclusive the left hand female part $D^{99}$ has an inner head $D^{10}$ and pins $D^{11}$ extending inwardly therefrom and the right hand male part $D^8$ has an inner head $D^{12}$ into which the pins $D^{11}$ of the head $D^{10}$ (Figs. 7, 14, 25, 26) of the left hand female part $D^{99}$ are riveted. The left hand male part $D^{88}$ has an inner head $D^{13}$ and the right hand female part $D^9$ has a corresponding head $D^{15}$ Figs. 7, 14, 22 to 24. The engagement of crab teeth $D^{16}$ on the heads $D^{13}$ and $D^{15}$ compels them to rotate synchronously and they are held together by a union nut $D^{17}$ or in a suitable manner as best shown in Figs. 7, 25 and 26. The head $D^{13}$ is provided with holes $D^{14}$ through which the pins $D^{11}$ of the head $D^{10}$ of the left hand female part $D^{99}$ pass before being riveted into the head $D^{12}$ of the right hand male part $D^8$; and to facilitate assembling, the tubular inward projection of the head $D^{13}$ on the left hand male part $D^{88}$ is made short while the corresponding inward tubular projection of the head $D^{15}$ on the right hand female part $D^9$ is made long, so that the combined tubular parts of the heads $D^{13}$ and $D^{15}$ form a chamber $D^{18}$ of sufficient length to accommodate the desired pressure-adjusting motions of the head $D^{12}$ on the right hand male part $D^8$.

In order to secure the drivers $D^1$ on the shaft parts $D^8$, $D^9$, $D^{88}$, $D^{99}$ I may flute the drivers and the ends of the said parts; and because the drivers pull on the male parts I also provide thereon screws $D^{19}$ and nuts $D^{20}$. The drivers thrust against the female parts and require no fastening other than fluting or other device to prevent the drivers from turning on the shafts and compel them to rotate together. In this design the pressure-adjusting apparatus P, consists of a screw $D^3$ formed on a female part, $D^{99}$, a nut $P^3$ engaging therewith, differential gear apparatus, for rotating the nut $P^3$ relatively to the shaft D, and means for operating or meshing and unmeshing the differentiating gear apparatus.

An extension of the nut $P^3$ abuts against the head $D^{10}$ preferably by a ball thrust bearing $b$ and said nut is engaged with said head against a pull by a collar and grooved ring engagement $c$, the engaging ring being split and held in place by a tubular extension $D^{21}$ of the union $D^{17}$. A spur gear $P^{22}$ is formed on the nut $P^3$ and a second spur gear $P^{23}$, having one less tooth than the wheel $P^{22}$, is secured to the shaft D preferably on the shaft section $D^{99}$. I also provide a releasing gearing $P^{24}$ which might be a single wheel, but for convenience is shown as two equal gears fixed on a shaft; and a setting up train $P^{25}$ which has two wheels $P^{26}$ and $P^{27}$ differing by one tooth. I provide means for engaging and disengaging the gears $P^{22}$ and $P^{23}$ with the setting up train $P^{25}$ and with the releasing gear $P^{24}$.

When the setting-up gear $P^{25}$ is meshed the nut $P^3$ is rotated forwardly relatively to the screw $D^3$ and the apparatus M is set up; and when the releasing gear $P^{24}$ meshes with the wheels $P^{22}$ and $P^{23}$ the nut $P^3$ is retarded relatively to the screw $D^3$ and the apparatus M is released.

To illustrate the action of these gearings let us assume definite proportions to them. Assign 61 teeth to the shaft wheel $P^{23}$, 62 teeth to the nut wheel $P^{22}$, 42 teeth to the releasing gear $P^{24}$ and to that wheel $P^{26}$ of the setting up train $P^{25}$ which meshes with $P^{23}$ and 43 teeth to the wheel $P^{27}$ which meshes with the nut wheel $P^{22}$; then when the releasing gear meshes, the shaft wheel $P^{23}$ makes a complete revolution while the nut wheel, $P^{22}$ is making 61/62 of a revolution and the nut $P^3$ is retarded 1/62 of a revolution per revolution of the shaft D.

When the setting-up train, $P^{25}$ engages, the shaft wheel $P^{23}$ makes $42/61 = 0.6885$ of a revolution while the nut wheel $P^{22}$ makes $43/62 = 0.6935$ of a revolution; the nut P rotates faster than the shaft D—to be exact the nut makes 138.7 turns while the shaft makes 137.7 turns and the apparatus M is set up.

In order that the releasing and setting-up gears, $P^{23}$ and $P^{24}$ may be engaged and disengaged at the will of the operator, I provide a crank motion mechanism such that by throwing a lever to one side the operator may release and by throwing it to the other side he may tighten up the apparatus M. by the engagement and disengagement of said gears. The shafts $P^{28}$ thereof are journaled in swinging frames $P^{29}$ on which I form trunnions $P^{30}$ which work in bearings $P^{31}$, $P^{32}$, $P^{33}$, $P^{34}$ following parallel with the axis of the shafts D and $P^{28}$.

Figure 15:
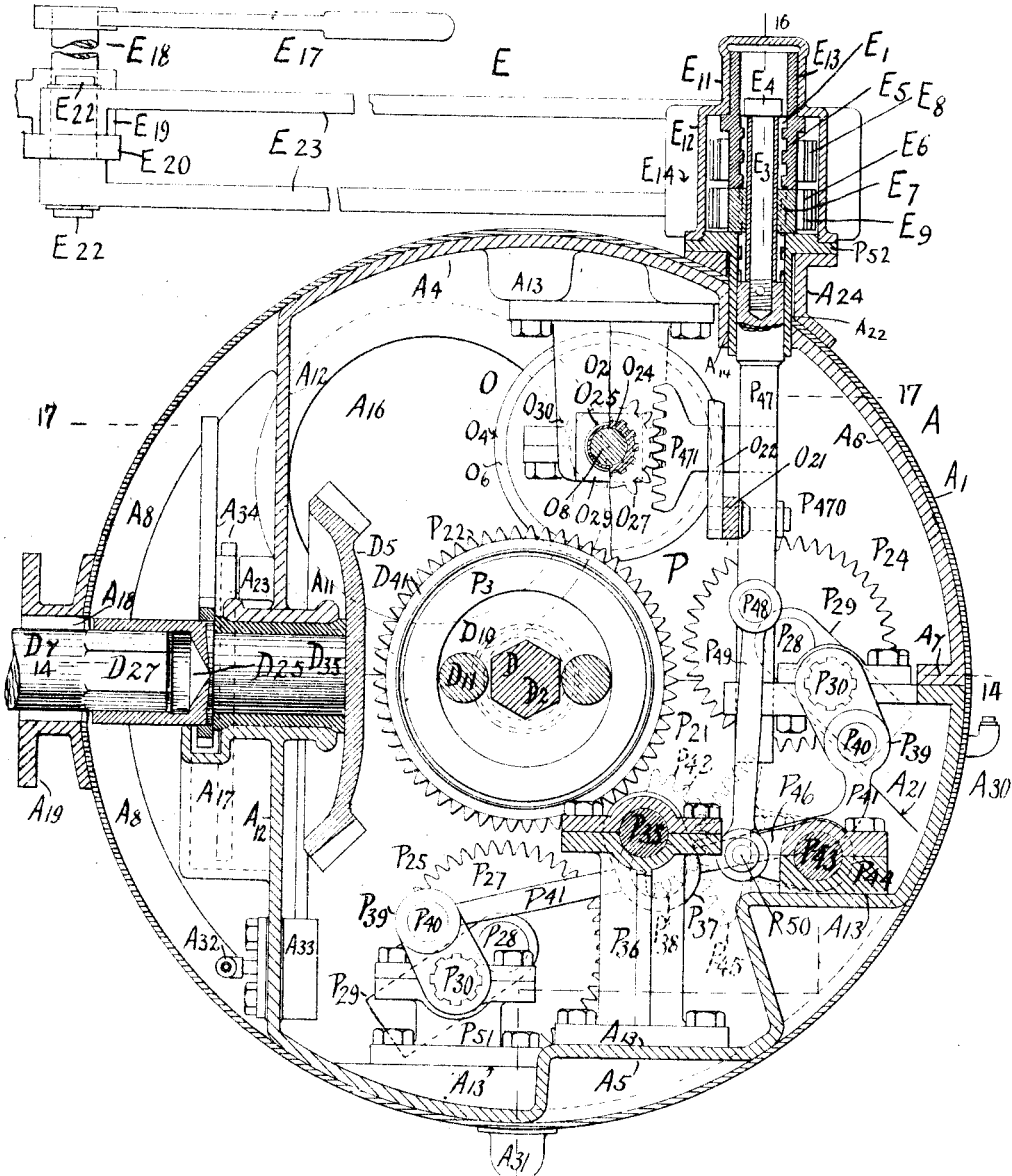

One gear train, say the releasing train $P^{24}$ is located at the horizontal joint $A^7$ of the case $A^4$ and the other train $P^{25}$ is located in the lower part $A^5$ of said case. Centrally between the axes of the trunnions $P^{30}$ of said swinging frames I locate a shift-crank shaft, $P^{35}$ journaled in a suitable frame $P^{36}$ and having a shift-crank $P^{37}$ and a crank pin $P^{38}$. I secure cranks $P^{39}$ with crank pins $P^{40}$ on the inner trunnions $P^{30}$ of the swinging gear frames $P^{29}$. I link the crank pins $P^{40}$ of the swinging frames P by links $P^{41}$ to the crank pin $P^{38}$ of the shift crank $P^{37}$. When it is in its central position, as shown in Fig. 15, all the gears are out of mesh. When said crank is swung to the left hand it moves the setting-up train $P^{25}$ into mesh and the releasing gears $P^{24}$ still farther from meshed position. When said crank is swung to the right hand it moves the setting-up train $P^{25}$ out of mesh and the releasing train $P^{24}$ into mesh. The shift-crank pin $P^{38}$ moves nearly 160 degrees and therefore it is not practical to give it motion by a link-and-pin connection I therefore extend the shift-crank shaft, P and secure on its end away from the crank $P^{37}$ a wheel segment $P^{42}$.

The shift-crank $P^{37}$ is directly controlled by an organization consisting in a crank shaft $P^{43}$ supported in a suitable frame $P^{44}$ and having on one end a wheel segment $P^{45}$ which engages the wheel segment $P^{42}$ on the shift-crank shaft $P^{35}$ and on the other crank arm $P^{46}$. To move the above described mechanism I provide a vertically movable control bar $P^{47}$ one end of which extends through the walls of the top $A^6$ of the assembling case $A^4$ and axle section $A^1$ so that it may be operated by the operator, and on said bar I provide a pin $P^{48}$ connected by a link, P⁴⁹ with the pin P⁵⁰ of the crank arm, P⁴⁶ of the shaft P⁴³. When the control bar P⁴⁷ is moved up or down the link P⁴⁹ rotates the crank arm P⁴⁶, shaft P⁴³ and wheel segment P⁴⁵ which by its engagement with the wheel segment P⁴² on the shift-crank shaft P³⁵ rotates the latter and its shift-crank shaft P³⁷ and the connected cranks P³⁹ on the trunnions P³⁰ of the swinging gear-carrying frames P²⁹ and thereby swings the gears P²⁴, P²⁵ in and out of mesh with the differentiating gear wheels P²², P²³.

When the control bar P⁴⁷ is at the upper limit of its stroke the releasing gear, P²⁴ is meshed and the setting-up train P²⁵ is farthest removed from meshing position; when at its middle position both the releasing and setting-up trains are in mean positions and safely out of mesh; and when it is at its lower limit of stroke the setting-up train is meshed and the release gear is farthest removed from meshing position. The release gear meshes with the revolution of the differentiating gears so as to be sure to go in mesh and the setting up train unmeshes with such revolution so as to be sure to unmesh when the operator so desires for it must be beyond doubt that the operator can stop his vehicle when it is necessary to do so. The bearing P³¹ for the outer trunnion P³⁰ of the swinging frame P²⁹ of the releasing train P²⁴ is formed in the flanged joint A⁷ of the case A⁴ and the bearing P³² for the inner trunnion thereof is formed on a bracket A²¹ on the base A⁵ of the case A⁴.

The frame P²⁹ of the setting-up train has its outer trunnion bearing P³³ formed in a head A⁹ of the lower part A⁵ of the case A⁴ and its inner trunnion bearing P³⁴ in a frame P³¹. The vertical control bar P⁴⁷ has a lower guide in the bracket A²¹ and its upper guide in a flanged tubular ferrule P⁵² extending through registering openings A²² in a boss A¹⁴ of the cap A⁶ of the case A⁴ and in the tubular central axle section A¹.

I provide a control apparatus E, exterior to the axle A and connected with the vertically-moving control bar P⁴⁷ by which the operator may shift the bar and set up or release the apparatus M.

In a vehicle it is necessary in order to give easy riding, to interpose springs between the axle and the chassis and body of the vehicle one result of which is that the axle and chassis and body have cushion motions relatively to each other.

One part of the control apparatus E is necessarily fixed on the body or chassis of the vehicle and other parts on the axle, connected with the mechanism M; and in designing the control mechanism E it is necessary to use parts so organized and related that the relative cushion motions of the axle and chassis, due to the springs, do not interfere with and nullify the controlling motions of the control apparatus E imparted to it by the hand of the operator.

My control apparatus E has this quality. To the head of the control bar P⁴⁷ I swivel a screw rod E¹ of about 45° pitch, said screw rod having a prismatic engaging part, shown as longitudinal slots E² and being rotatable on a bolt E³ the head E⁴ of which retains it relatively to the control bar P⁴⁷. The screw E¹ passes through two wheel segments one of which, E⁵ forms a nut engaging with the screw E¹ and the other wheel segment E⁶ contains an abutment for said prismatic part of the screw rod, shown as splines, E⁷ which engage the slots E² of the screw E¹. The action of these parts is such that if both the wheel segments E⁵ and E⁶ rotate together the screw is not operated and the position of the control bar P⁴⁷ remains unchanged, however much the two wheel segments are rotated in the same direction and at the same speed. But if the said wheel segments are rotated relatively to one another, either by being turned in opposite directions or at different speeds in the same direction, then and in that case the engaging splines E⁷ in the wheel segment E⁶ and slots E² in the screw E¹ serve as abutments for the screw and nut and the screw traverses the nut and moves the control bar P⁴⁷, imparting the desired control motion to the pressure adjusting apparatus P.

In order to give the wheel segments E⁵ and E⁶ the necessary relative rotatory motions, independent of the axle and chassis cushioning movements, I provide gearing, which might be racks but are more conveniently and safely housed if wheel segments, E⁸ and E⁹, meshing respectively with the aforesaid segments E⁵ and E⁶ and having outwardly extending arms E¹⁰.

All the wheel segments are contained in a case E¹¹ secured on the ferrule P⁵² and having a tubular part E¹² axially with the screw E¹ for the segments E⁵ and E⁶ a bearing E¹³ for the nut segment E⁵ a pocket E¹⁴ for the segments E⁸ and E⁹ and bearings, E¹⁵ for the spindles E¹⁶ thereof. The case E¹¹ is closed save for the opening where it joins the ferrule P⁵² and the openings for the spindles E¹⁶, so as to be dust tight.

To control the operative movements of the wheel segments I provide a hand lever E¹⁷, on an end of a shaft E¹⁸ suitably rotatable in a bearing or bearings E¹⁹ on the chassis H of the vehicle and on the other end of said shaft a double crank head, E²⁰ with pins E²¹ substantially 180° apart, one connected by a link E²² with the arm E¹⁰ of the segment E⁸, the other similarly connected with the segment E⁹.

The operation of the control apparatus E is as follows:—While the hand lever E¹⁷ remains in a central position the parts of the apparatus M are unchanged in relative position save for the rotation of the driving parts. When the operator desires to set up the mechanism M, to increase the speed or torque of the drive, he moves his hand lever $E^{17}$ to the right, rotating the shaft $E^{18}$ and crank head $E^{20}$ and by means of the links $E^{22}$ rotating the wheel segment $E^8$ negatively and the meshing nut segment $E^5$ positively and the segment $E^9$ positively and the meshing spline segment $E^6$ negatively, which drives down the screw $E^1$ and control bar $P^{47}$, and throws the setting up train $P^{25}$ in mesh with the differentiating wheels $P^{22}$ and $P^{23}$. When he has adjusted the speed and torque of the drive he will return the hand lever $E^{17}$ to central position and unmesh the gears $P^{25}$, $P^{22}$, $P^{23}$. When he desires to reduce the speed and torque of the drive he will move the hand lever $E^{17}$ to the left hand, rotate the segment $E^8$ positively and the engaged nut segment $E^5$ negatively, the segment $E^9$ negatively and the meshing spline segment $E^6$ positively, transverse the screw $E^1$ and control bar $P^{47}$ upwardly and mesh the releasing gear $P^{24}$ which he can unmesh by returning the hand lever $E^{17}$ to central position.

It will be seen that the screw $E^1$ cannot be caused to travel by any motion other than a rotatory movement of the shaft $E^{18}$ and its crank head $E^{20}$ and that relative motions of the axle A and chassis H will merely change the distance between the crank head $E^{20}$ and the axis of the wheel segments and cause $E^8$ and $E^9$ to rotate together in one direction and $E^5$ and $E^6$ to rotate together in the opposite direction which movements will have no control effect whatever, because they will merely whirl the screw $E^1$ on the bolt $E^3$ without calling into play the screw functions of the apparatus.

It will be seen that the case $E^{11}$ has no unclosed openings whatever after it is assembled in place. The bearings $E^{15}$ for the spindles $E^{16}$ are bored and counterbored, the segments $E^8$ and $E^9$ are entered through the main opening in the tubular part $E^{13}$ of the case, the spindles $E^{16}$ are driven home and the arm $E^{10}$ secured to them.

The head of the control bar $P^{47}$ must be within the periphery of the case $A^4$ while it is being entered into the axle section $A^1$; and when it is in place the control bar $P^{47}$ can be drawn up, the screw $E^1$ bolted on it and the bolt $E^3$ pinned in its socket in the control bar $P^{47}$. The guide ferrule $P^{52}$ can then be put in place and secured to a flange section, $A^{24}$, which has been riveted to the axle section $A^1$ enveloping the opening $A^{22}$. The spline wheel segment $E^6$ and the nut wheel segment $E^5$ can then be assembled on the screw $E^1$ and the case $E^{11}$, containing the wheel segments $E^8$ and $E^9$, can then be put over the projecting part of the screw $E^1$ and the wheel segment $E^5$ and $E^6$ and secured to the flanged ferrule $P^{52}$.

When the pressure-adjusting apparatus P is in operation, to set up or release the apparatus M, it is driven by full engine power; and in case the operator did not suspend its operation soon enough it would function to one end of its travel and then either stop the engine or be broken by it, unless I provide an automatically-operative throw-out mechanism to throw the wheels $P^{22}$, $P^{23}$ and $P^{24}$ or $P^{25}$ out of mesh when the mechanism M is fully set up or released. I provide such a throw-out mechanism O, consisting in friction wheel surfaces on revolving parts of the shaft D, friction wheels rotatable in bearings, a screw rod traversing the said friction wheels and a toggle joint arrangement connecting the said screw rod and the control bar $P^{47}$, by which the said bar will always be returned to its mean position, or position in which the differentiating wheel systems are out of mesh when the pressure adjusting mechanism P has reached the limit of its stroke.

Figure 16:
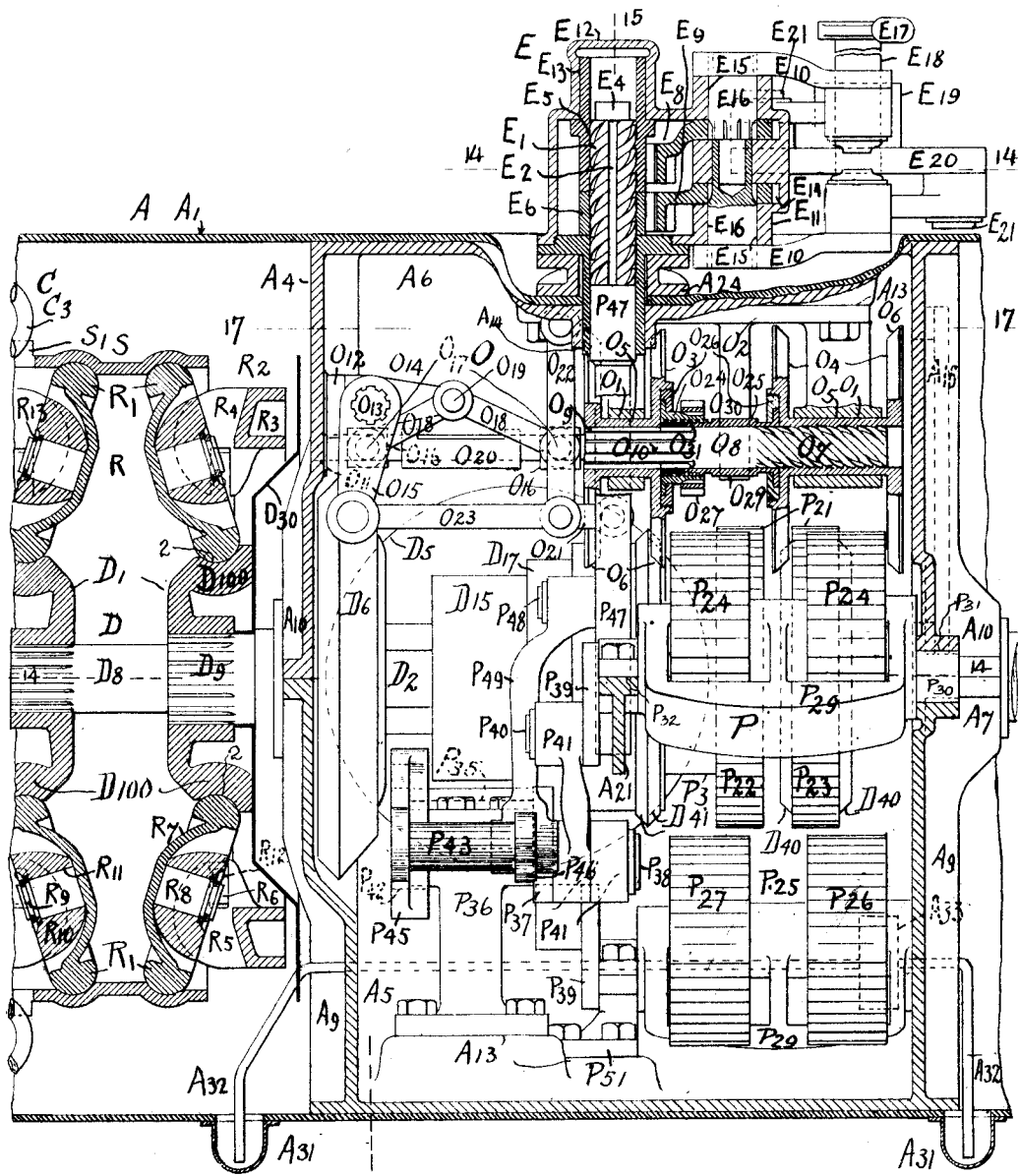
Figure 17:
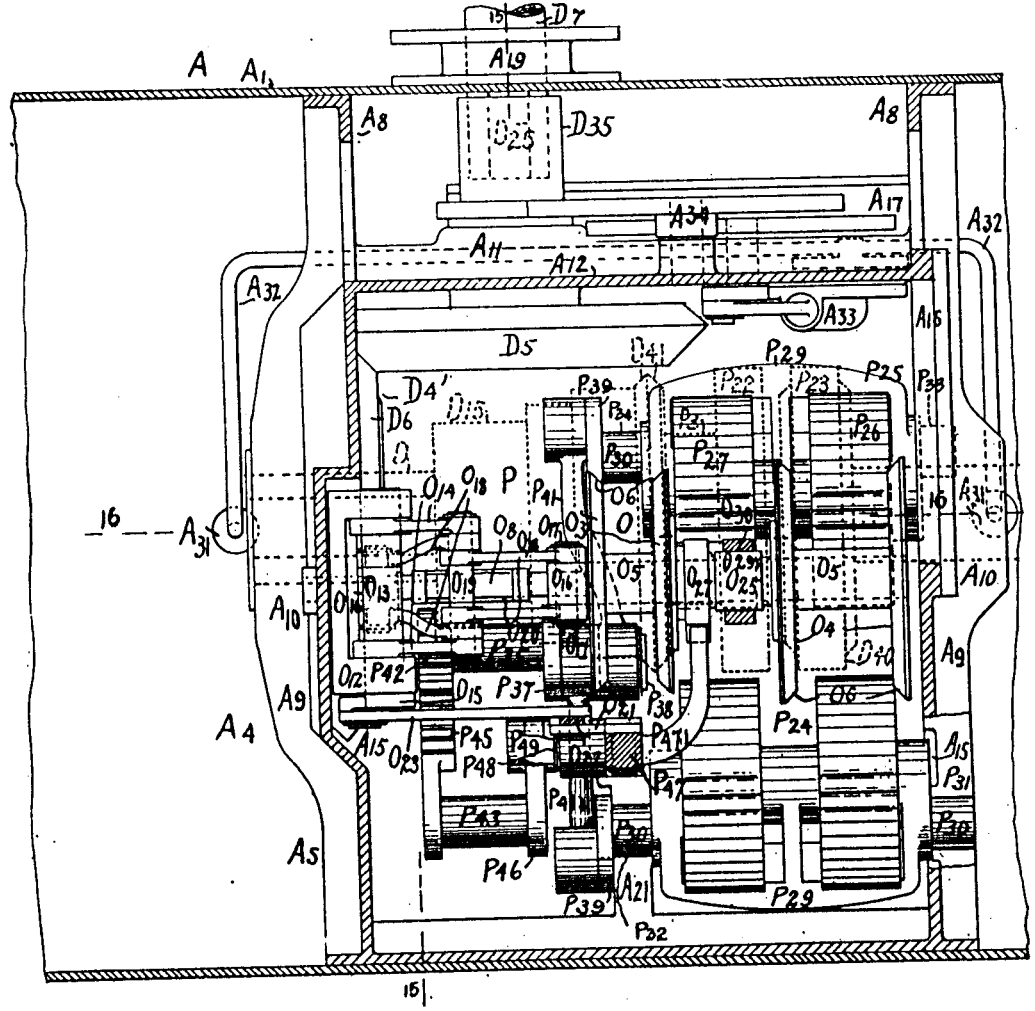

The apparatus O is best shown in Figs. 15, 16 and 17 in which $D^{40}$ are friction surfaces formed on a wheel $P^{23}$ and $D^{41}$ are like surfaces formed on a part connected with the shaft D, as illustrated, on the tubular extension $D^{21}$ of the union nut $D^{17}$. One pair of said friction surfaces is larger in diameter than the other: in the drawings the pair $D^{41}$ on the shaft D are larger than the pair $D^{40}$ on the nut wheel $P^{23}$. These surfaces might be located on any revolving parts of the shaft D or connected with it, as their functions depend solely on revolving them.

Parallel with the shaft D I provide bearings $O^1$ axial with each other, in a suitable frame $O^2$ secured to the cap $A^6$ of the case $A^4$ and two pair of friction wheels $O^3$, $O^4$, revoluble in said bearings, the wheels of each pair being connected by a tubular bearing or throat $O^5$ and adapted to and slightly longer than the bearing $O^1$ in which it is to rotate, so that said wheels may have a slight longitudinal traverse in their bearings. The wheels $O^3$, $O^4$ have friction surfaces $O^6$, each of such surfaces being adapted to run with that friction surface $D^{40}$ or $D^{41}$ on the shaft system which faces it. The friction surfaces of one pair of wheels are of greater diameter than those of the other pair; for example the wheels $O^3$, which are adapted to engage the surfaces $D^{41}$ on the shaft system are smaller than those $O^4$ adapted to engage the surfaces $D^{40}$ on the gear wheel $P^{23}$. The friction surfaces of each pair are spaced from one another a distance very slightly greater than the distance separating the pair $D^{40}$, or $D^{41}$ with which they engage, plus half the relative axial movement of the nut $P^3$ and screw $D^8$. One of the pairs of wheels, say $O^4$ forms a nut for a screw $O^7$ of about 45° pitch formed on a traversing bar $O^8$ and the other pair $O^3$ has an abutment, shown as splines, $O^9$, engaging a prismatic engaging portion, shown as slots $O^{10}$ formed in the bar $O^8$, the wheel pair $O^3$ thus forming an abutment for the screw function of the wheel pair $O^4$ and screw $O^7$ on the bar $O^8$, so that when the wheel pairs $O^4$ and $O^3$ rotate at different angular velocities the bar $O^8$ will be traversed axially by the screw and nut.

The bar $O^3$ extends beyond the inner wheel pair $O^3$ and has a guide bearing $O^{11}$ in the head $A^9$ of the case $A^4$ or in a frame $O^{12}$ secured thereto. A toggle shaft $O^{13}$ located above the outer end of said bar $O^8$ and at right angles with it has secured to it a pair of toggle arms $O^{14}$ extending inwardly and one arm $O^{15}$ on an end thereof and extending downwardly. Trunnion blocks $O^{16}$ carrying trunnions $O^{17}$ are located and adapted to slide on the bar $O^8$ and are connected by links $O^{18}$ each pivoted at one end on a trunnion $O^{17}$ and at the other end by a pin $O^{19}$, on the arms $O^{14}$ and a tappet, $O^{20}$ is secured on the bar $O^8$ between the trunnion blocks $O^{16}$.

A link $O^{21}$ is pivoted at one end on a pin $P^{470}$ on the control bar $P^{47}$ and at the other end on a link $O^{22}$ the other end of which is pivoted on the frame $O^2$, nearly vertically above the mean position of the lower end of said link $O^{22}$; and a link $O^{23}$ connects the links $O^{21}$ and $O^{22}$ with the operating arm, $O^{15}$, on the toggle shaft $O^{13}$. The operation of this device is as follows:—When the nut $P^3$ and screw $D^3$ screw out to the limit of their travel the outer friction surfaces, $D^{40}$, $D^{41}$ on the shaft contact with the outer friction surfaces $O^6$ on the outer wheels of the pairs $O^4$, $O^3$ respectively; and when said nut $P^3$ and screw $D^3$ screw in to the inner limit of their travel in releasing the mechanism M, the inner friction surfaces $D^{40}$, $D^{41}$ on the shaft D. contact with the inner friction surfaces $O^6$ on the inner wheels of the pairs $O^4$, $O^3$ respectively; said wheels are rotated and because they are of different diameters or in different ratios to their drivers they are rotated at different speeds. The splines $O^9$ in one wheel $O^3$ and the slots in the bar $O^8$ act as abutments for the screw $O^7$ and the nut in the wheel pair $O^4$ and the screw functions to traverse the bar axially in one direction or another. Whichever way the bar $O^8$ moves it will return the control bar $P^{47}$ to mean position, as shown in Fig. 16, and unmesh whichever wheel train, $P^{24}$ or $P^{25}$ may be at such time meshed with the wheels $P^{22}$ $P^{23}$. For when the said wheels are meshed the bar $P^{47}$ is at one limit of its stroke. When the gear train $P^{24}$ is in mesh it is at its upper limit and when train $P^{25}$ is in mesh it is at its lower limit and at whichever limit said control bar $P^{47}$ may be, the link $O^{21}$, pivoted on the bar $P^{47}$ is inclined and its outer end and pivotal connection with the vertical link $O^{22}$ is drawn in toward the control bar $P^{47}$, the outer end of the operating arm, $O^{15}$ on the toggle shaft $O^{13}$ is drawn toward the control bar $P^{47}$, the toggle arms $O^{14}$ on the shaft $O^{13}$ are raised, the ends of the toggle links $O^{18}$ pivoted on said arms are drawn up by them and the trunnion blocks $O^{16}$ are drawn in toward the tappet, $O^{20}$ and a movement of the bar $O^8$ tappet $O^{20}$ in either direction, will cause the tappet $O^{20}$ to contact with a trunnion block $O^{16}$ and operate the toggles to return the toggle system and the control bar $P^{47}$ to the position shown in Fig. 16 which is the release position relatively to the differential gears $P^{22}$, $P^{23}$, $P^{24}$ and $P^{25}$.

When the above system operates, the friction surfaces $D^{40}$, $D^{41}$ are at inner or outer limits of their stroke, positions in which they will operate the wheels $O^3$, $O^4$; and in order that the operator may change the drive of my mechanism it is necessary that I provide a slight axial adjustment, at such times, of said wheels; as were they to be axially fixed in position, the friction surfaces $D^{40}$, $D^{41}$ now at inner or outer limits of their stroke, must act to throw the pressure adjusting apparatus P out of action and it would be impossible, without such a provision, for the operator to change the drive. I therefore provide tubular swivels one $O^{24}$, swiveled on a wheel as $O^3$ and one $O^{25}$, swiveled on a wheel as $O^4$, confined by suitable nuts $O^{26}$, a wheel segment, $O^{27}$ on one swivel as $O^{24}$, a rack $P^{471}$ on the vertically moving control bar $P^{47}$, said rack meshing with the wheel segment $O^{27}$ and rotating it and the swivel $O^{24}$ slightly when the control bar $P^{47}$ is moved, a square die $O^{29}$ on the other swivel $O^{25}$, a slotted projection $O^{30}$ on the frame $O^2$ engaging said squared die on the swivel $O^{25}$, which prevents said swivel from rotating while permitting it to slide axially, a male screw $O^{31}$ on one swivel, as $O^{25}$ and a corresponding nut in the other swivel. The above described organization prevents the friction surfaces from grinding one another out uselessly by slightly moving the wheels $O^3$ and $O^4$ axially, after they have operated, away from the operating friction surfaces $D^{40}$ and $D^{41}$ and also permits the operator to move the pressure adjusting mechanism away from a limit which it has reached, but prevents him from moving it in the direction of such limit; for he must move the control bar $P^{47}$ up to unscrew the nut $P^3$ and screw $D^3$ and lessen the distance between the friction surfaces $D^{40}$ and $D^{41}$ and move the control bar $P^{47}$ down and screw up the nut $P^3$ and screw $D^3$ in order to increase the distance between the said surfaces $D^{40}$ and $D^{41}$.

The operation of the screw $O^{31}$, is opposed to that of the screw $D^3$ and nut $P^3$; because a downward motion of the control bar $P^{47}$ and its rack $P^{471}$ through its engagement with the wheel segment $O^{27}$ functions the screw $O^{31}$ to draw the friction wheels $O^3$ and $O^4$ together and shortens the possible setting-up stroke, and lengthens the possible release stroke of the screw $D^3$ and nut $P^3$; while an upward motion of said bar functions the screw $O^{31}$ to separate the wheels $O^3$ and $O^4$, shortens the release stroke and lengthens the setting-up stroke of the screw $D^3$ and nut $P^3$.

It follows that when the screw $D^3$ and nut $P^3$ have traveled to either limit of their stroke and operated the throw-out mechanism O, if the operator attempts to move the control bar $P^{47}$ in the direction which would renew the kind of action just discontinued the wheels $O^3$ $O^4$ would function with the surface $D^{40}$ $D^{41}$ of the shaft D and the throw-out mechanism would operate to prevent such injurious action. But if on the contrary he moves the control bar $P^{47}$ in the direction to accomplish the opposite function of the screw $D^3$ and nut $P^3$ such motion of the control bar $P^{47}$ will move the wheels $O^3$ $O^4$, in such manner that their friction surfaces 96 will be out of contact with the shaft friction surfaces $D^{40}$, $D^{41}$, the throw-out apparatus will not be operated, and the pressure-adjusting apparatus P will operate in the desired or proper manner. If set up to its proper limit said mechanism can be released but not further tightened and if backed off to its proper limit it can be set up, but not backed off farther.

After my mechanism M and axle A are assembled and the latter is secured to the chassis H of the vehicle, the propeller shaft $D^7$ is entered through the flanged opening $A^{18}$ and its case, $A^{20}$, is riveted to the flanged nozzle $A^{19}$.

I prepare for easy connection of the propeller shaft $D^7$ with my apparatus M by forming a polygonal or prismatic head $D^{27}$ on the engaging end of said shaft and a corresponding socket $D^{28}$ in the outer end of the journal $D^{35}$ of the driving bevel gear $D^5$, the axis of said journal $D^{35}$ being transverse of that of the shaft D and being in the plane of the joint $A^7$ of the assembling case $A^4$, in each face of which joint I form a half of a bearing $A^{11}$, for said journal $D^{35}$. A driven bevel gear wheel $D^6$ meshes with said driving wheel $D^5$ the journal $D^{26}$ of which works in an axial bearing $A^{10}$ of the case $A^4$ and said wheel drives the shaft D by engagement of closely fitting prismatic or polygonal sections $D^2$, in the journal of said wheel and on the female part $D^9$ of the shaft. The cross connected shaft members are axially movable in the journal $D^{26}$ of the driven bevel wheel $D^6$; and the cross-connected shaft sections $D^8$, $D^{99}$, and $D^{88}$, $D^9$ are also axially movable relatively to one another and are synchronized by polygonal or prismatic fitting sections $D^2$ and also by the engagement of the pins $D^{11}$ in the holes $D^{14}$. The right hand female part $D^9$ and male part $D^8$ extend beyond the driven gear $D^6$ and the left hand male and female parts extend through and beyond the opposite axial bearing $A^{10}$.

I have heretofore described the cross connection of the male and female shaft sections, and the attachment of the drivers $D^1$ to the same. It should be noted that it is highly desirable that the spacing of the drivers D should be exact.

Figure 14:
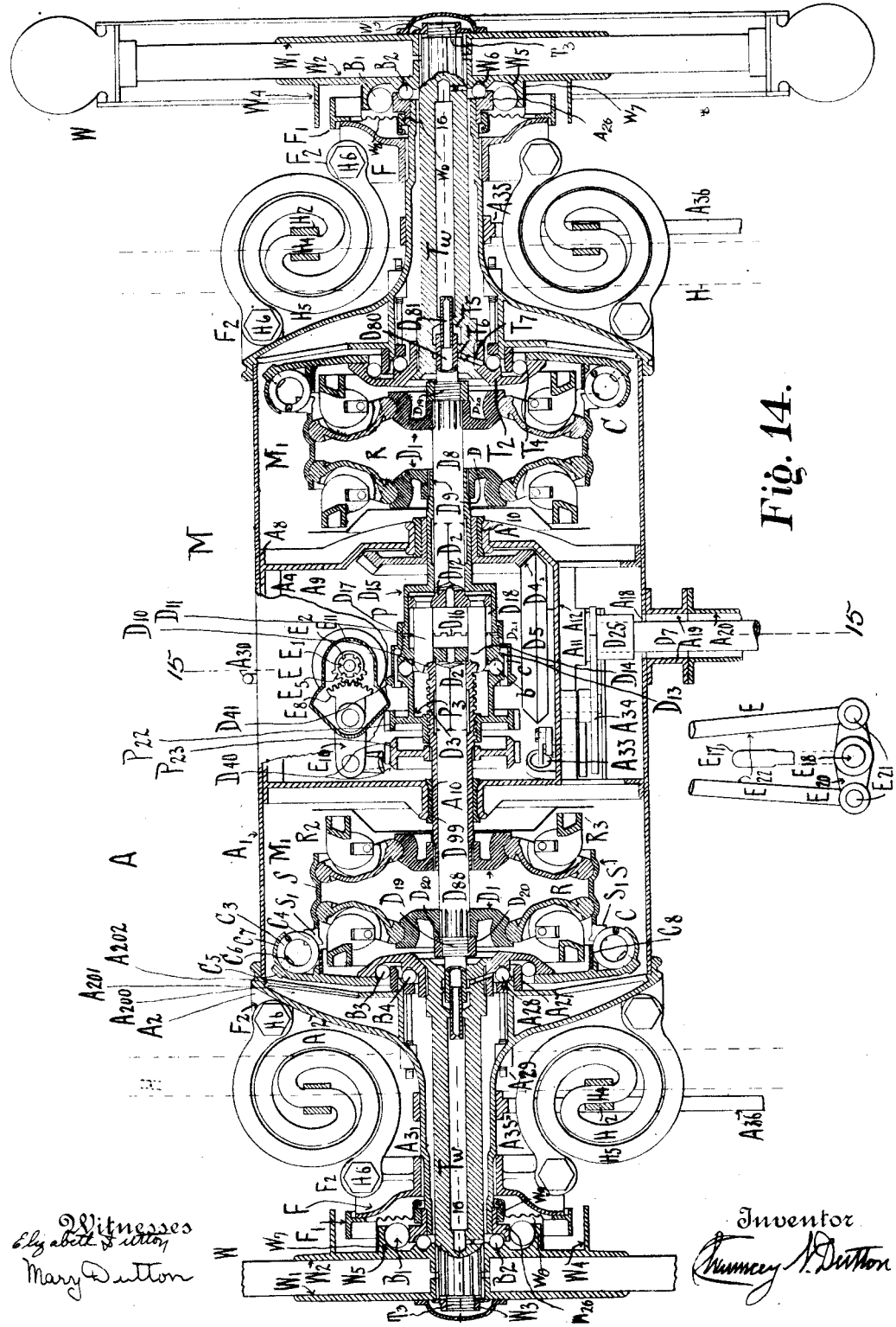

The preferred construction of the drivers $D^1$ and rollers R is shown in Figs. 14 and 16. The driver $D^1$ is cut out to form a rim $D^{100}$, in which I form grooves 2 corresponding with the rounded rims of the rollers R, which are also hollowed out to form heavy rounded rims $R^1$, this construction giving an elastic drive like ring, in lieu of a dead drive like rigid bodies.

I have found by practical experience that it is necessary to use some form of spacing device $R^2$ to prevent the rollers R from bunching up and grinding grooves in one another. I have obtained very satisfactory results with a device such as illustrated in Figs. 14, 16 and 18 to 21 inclusive.

As therein illustrated I provide a spacing ring, $R^3$ with lugs $R^4$ disposed in pairs, each pair forming a radial slot $R^5$ and having circumferential smaller slots, $R^6$ parallel with the ring body. The rollers R have a light substantially spherical web $R^7$ concave toward the spacing rings $R^3$ and a central stud, $R^8$ the length of which is substantially the wheel thickness, on the end of which I form a shoulder and a groove $R^9$. Guide blocks, $R^{10}$, shown in detail in Figs. 20 and 21, formed with a central stud bearing $R^{11}$ and side trunnions $R^{12}$, are revoluble on the studs $R^8$ of the rollers R and are confined thereon by washers and spring clips $R^{13}$ which engage the grooves $R^9$ in the studs $R^8$. The guide blocks $R^{10}$ lie and work in the radial slots $R^5$ of the ring $R^3$ and smaller guide blocks $R^{14}$ pinned on the side trunnions of the large blocks, lie and work in the circumferential slots, $R^5$, in the lugs $R^4$.

In operation the spacing ring adjusts itself to revolve about its center of gravity; it is held at a determined distance from the rollers R by the trunnions $R^{12}$ and trunnion guide blocks $R^{14}$ working in the slots $R^6$; and spaces the rollers R very satisfactorily.

One object of hollowing out the rollers R and making the studs $R^8$ within their bounding planes is so that the action between the guide blocks $R^{10}$ and the cheeks of the radial slots $R^5$ will be in the plane of revolution of the rollers R and there will be no moments tending to twist the rollers in the grooves 1, as would be the case if the drive of the guide blocks $R^{10}$ was in a plane outside of the rollers R.

The preferred construction of the resilient S is shown in Figs. 14, 16, 27 and 28. It is made of the finest spring steel, is of uniform thickness, and has internal grooves 1 for the rollers R and engaging teeth $S^2$ formed in an edge or edges. The preferred connection C is illustrated in the same figures. A spring $C^3$ is so wound that engaging or contact making parts $C^4$ are angularly inclined to the general helix of the spring and adapted to engage the engaging teeth $S^1$, of the resilient S, and when so engaged will be radial and substantially parallel with the adjacent faces of the teeth $S^1$ of the resilient S. A head, $C^5$, suitably connected with the driven or wheel shaft $T^w$, is armed with pins, $C^6$ which enter and engage the convolutions of the spring $C^3$ and has a lip $C^7$ which partly envelops the spring $C^3$, and a ring $C^8$ pinned to the head $C^5$, retains the spring $C^3$ against the lip $C^7$.

The head $C^5$ may be of inferior metal and riveted to a steel head, $T^2$, fluted and riveted to the wheel shaft $T^w$. An elastic connection C is necessary for vehicles because the resistance of the wheel W may suddenly vary from nothing to the weight of the vehicle and rigid connections would be unworkable.

The wheels W are secured on the wheel shafts $T^w$ by means of outer and inner hub plates, $W^1$, and $W^2$ respectively, both fluted to the shaft, and a nut, $W^3$ engaging a screw, $T^8$ on the shaft end. The inner hub plate $W^2$ has formed on it a brake flange, $W^4$, a load-carrying ball race, $W^5$ and a thrust ball race, $W^6$. The weight of the vehicle is imposed on the wheel by a ball bearing B, the balls racing in the race, $W^5$ and the vehicle weight being put on said balls by means of a collar $A^{26}$, on the end of the tubular extension $A^3$ of the axle head $A^2$ on which I also form the other race of the thrust bearing $B^2$.

As the tread of the wheel W overhangs the load carrying ball bearing $B^1$, a downward moment occurs at the inboard end of the wheel shaft $T^w$ and I therefore provide a light ball bearing $B^3$, between a ball race $T^4$ formed in the head $T^2$ of the shaft $T^w$, and a race on a ring $A^{27}$ secured to the head, $A^2$ of the axle A. I also form a thrust ball bearing $B^4$ one race of which is on the head $T^2$, the other on a ring $A^{28}$ centered in the axle head $A^2$, and adjustable by set screws $A^{29}$. The objects of the thrust bearings $B^2$ and $B^4$ are to take up end play and rattle and properly locate the wheels W and shaft heads $T^2$.

I provide for continuous lubrication by filling the base $A^5$ of the assembling case $A^4$ with oil, through a suitable filling plug $A^{30}$ located at the height at which it is desired the oil shall stand, boring out my male shaft parts $D^8$, $D^{88}$ and wheel shafts $T^w$ so that the oil can work out to all the bearings and return through the axle to drip cups, $A^{31}$, from which it is pumped back through pipes $A^{32}$ by a continuously driven pump $A^{33}$ suitably geared by a gear train $A^{34}$ to the journal, $D^{35}$ of the driving bevel gear $D^5$. To prevent the escape of oil at the wheels I provide tubular sheet metal drip cups $W^7$ fitting tightly on the outside of the ball races $W^5$, having corrugated faces $W^8$ and steel rings $W^9$, a close fit on the rings $A^{26}$. I form tubular extensions $D^{80}$ on the male shaft parts $D^8$, $D^{88}$ which enter the bores in the wheel shafts and serve as weight-carrying bearings and into said tubular extensions, $D^{80}$, I drive small tubes $D^{81}$, the outlets of which are fine holes with sharp lips. The bores of the wheel shafts $T^w$ fit the tubular ends $D^{80}$ of the shafts sections $D^8$, $D^{88}$ and also the small tubes $D^{81}$, beyond which said bores are enlarged, being enlarged also into a chamber $T^5$ about the shaft ends $D^{80}$. Grooves $T^6$ are formed around said ends and from said grooves channels $T^7$ with small, fine lipped orifices $T^8$ extend to the ball races $T^4$. Similarly fitted channels $T^7$ extend to the ball races $W^6$ on the hub plates $W^2$. Oil will pass through the bores in the shafts to the ball races, lubricate them, and return through the axle to the drip cups $A^{31}$ and be thence pumped back into the case $A^4$. The fine lipped orifices will prevent too rapid flow and the sharp lips will prevent gumming the orifices. The variations in diameter in the bores in the wheel shafts will secure even oil distribution.

The drivers D, resilient S and rollers R are protected from oil which will work through the axial bearings $A^{10}$ by sheet metal shields $D^{30}$ which fit tightly on the shaft sections $D^9$, $D^{99}$ and extend outwardly beyond the protected parts so that oil working through said bearings will be thrown out to the walls of the axle section $A^1$.

The axle heads $A^2$ carry beam stresses from the tubular axle extensions $A^3$ to the central section $A^1$ and must be very stiff. To combine stiffness with handsome finish I make said heads with smooth outer walls $A^{200}$ internal ribs $A^{201}$ and an inner diaphragm $A^{202}$ which extends out from the axis only far enough to give the necessary strength. The tubular axle extensions $A^3$ are turned up to fit the ring ends, $A^{35}$ of radius rods $A^{36}$, pivoted on the chassis, to distance the axle from it. Adjacent to their outer ends said axle extensions $A^3$ are fluted to receive cast metal brake abutments F to which I rivet wrought metal brake abutment rings, $F^1$ and on which I form lugs $F^2$ for the attachment of springs. Similar lugs $F^2$ are formed on the axle head $A^2$, all such lugs being in one horizontal plane substantially central of the axle. To form the springs illustrated in Figs. 14, 29, 30 and 31, I provide a flanged attachment H² having a flange H³ by which it can be riveted to the chassis H and a socket H⁴ to fit the bar, H⁵, of which the spring is to be made. Said bar is slipped into the socket H⁴ and eyes H⁶ are then formed on the ends of the bar. The bar H⁵ is then wound into a double involute spring, as shown in Figs. 14 and 29 the eyes H⁶ being at the extremities of the outer coils, the attachment H² is riveted to the chassis by means of the flange H³ and the eyes H⁶ are bolted, one to the lug F² on an axle head A² the other to a similar lug on a brake abutment F. I place one such spring on each side of each end of an axle, making four to an axle. Such spring support for the chassis and body will give very much better cushioning than has ever heretofore been accomplished, as the spring resistance will be very well graduated. Light shocks will be cushioned mainly on the outer coils and as the shock increases the resistance of the inner coils will come into action. I assemble the drive parts M¹ and pressure-adjusting apparatus P on the base A⁵ of the case A⁴. The members are located by reference to the axes of said case; and to that end the seats, A¹³, to which I affix my small supporting frames are all parallel with the horizontal joints A⁷, so that said seats can be finished by boring and counterboring. To keep down the weight such seats are formed by inwardly recessing the cylindrical wall of said case.

The throw-out mechanism O is assembled on the cap A⁵ of the case A⁴, the cap is then placed on the base A⁵ and bolted thereto, a single pin connection between the toggle system and the control bar P⁴⁷ being made after the parts A⁵ and A⁶ are united, the hand hole A¹⁶ being provided for the purpose. All the members connected with the case A⁴ are at such time inclosed within it and after being bolted up the case A⁴ with my shaft, pressure adjusting and control mechanism in position is slid into the axle section A¹ and secured in proper location axially therein; the rollers and resilients are put in place and the heads A² of the axle, in which the wheel shafts T^w and the parts attached thereto have been assembled, are secured to the central axle section A¹. The control bar P⁴⁷ is then drawn out until its head projects and the ferrule P⁵² and the control apparatus E is assembled with it.

The operation of my mechanism will be more readily understood if I describe the stresses and strains to which its members are subjected. Roller action has not been properly described in books and the commonly used formulæ are empirical and mostly wrong. Yet roller action is one of the most important of mechanical functions. By it, so great is its range of action, we produce the smoothest running bearing, propel a railroad train and smash down a steel ingot into a beam or armor plate. In a plain roller the strains are crushing and shearing in the vertical axis and shearing and tension in the transverse axis. The roller strains are much affected by the nature of the body or bodies on which the roller acts. In my mechanism, in order to get the greatest possible duty per unit of weight, I so shape and proportion the members of the roller group as to cause the greatest possible strain per unit of stress and so increase to the limit the elastic and resilient action of my members, changing the dead action of a plain roller into a vital, active, elastic thing. Thus by cutting out the centers of my drivers D¹ and rollers R, I change the direction of the crushing strains from axial to circumferential, increase the strain and elasticity, enlarge the surfaces of contact, increase the grip or adhesion and enlarge the body which resists surface abrasion by shearing resistance and thereby lengthen the life of the members.

By proportioning the thickness and sectional area of the resilient S to its duty, I cause it to do its work as a perfect spring, solely by shearing elasticity, or elastic resistance to shearing between its molecules its effectiveness as a spring per unit of weight being nearly twice that of a helical spring, because, as in hollow shafts, its substance is all nearly equally distant from the axis.

It can be demonstrated that, save for the axial strains between any two rollers opposite or nearly opposite one another in different grooves 1, the resilient S is free from crushing stress, being subject circumferentially only to tension and shearing. There is no circumferential bending as the word "bending" is commonly understood; that is to say there is no opposite compression and tension on opposite sides of a neutral axis. On the contrary all the fibers are circumferentially in tension and shearing and changes of shape, induced by changes of pressure between the rollers and the drivers and resilient or by rotating the drivers and rollers, call into action elastic resistance to tension and shearing when the pressure is changed with or without revolving the rollers and elastic resistance to shearing only when the rollers are revolved without changing the pressure.

The operation of my apparatus M is as follows: Power is conveyed to it by the propeller shaft D⁷ or otherwise; as illustrated for a vehicle transmission, clutch and differential, the propeller shaft engages and drives a bevel gear D⁵, which engages and drives a bevel gear D⁶ on the shaft D. The revolution of the bevel gears and shaft D drives the drivers D¹. Dependent upon the pressure and load the rollers R convey the power to the resilient S as rigid members or as rolling members. When the load or resistance of the driven shafts is light relatively to the pressure my mechanism drives as one piece, the drivers and driven revolving synchronously, without rolling the rollers relatively to the drivers and resilient.

If the pressure be reduced or the load increased the rollers roll between the drivers and resilient and its speed of rotation is reduced relatively to that of the drivers, proportionally to the increase of load or reduction of pressure. To alter the drive the operator swings his hand lever E¹⁷, say to the right to increase, to the left to decrease the speed or torque. A motion of said lever to the right will depress the control bar P⁴⁷ by the action of the wheel segments and screw of the control apparatus, engage the setting up gear train P²⁵ with the differential gears P²² and P²³ on the nut P³ and shaft D and screw the nut P³ up on the screw D³, approach the drivers D¹ of the pairs and by toggle action with the rollers R and resilient S force the outer limbs of the rollers out against the resistance of the resilient, increase the strains in it and increase the speed or torque of the drive, and vice-versa for a left-hand motion of said lever. Obviously, in a vehicle, the torque of the resilient and wheel shafts depends upon the physical condition of the road; and as that varies under the wheels W the operator must adjust his driving torque to suit road conditions.

If the pressure between the members is very light the mechanism will revolve without driving; as will also be the case when the resistance is so great that the apparatus cannot overcome it. This quality fits my apparatus to act as a differential and permits a vehicle driven by it to round corners; at which times the rollers on the far side of the axle which are driving that vehicle wheel which is describing a large circle will drive in the manner normal with the existing resistance and pressure and those on the near side which are driving that vehicle wheel which is describing a small circle or it may be serving as a pivot will roll much more, relatively to their drivers and resilient, than those on the far side.

The capacity of the rollers to roll adapts the apparatus to very heavy and irregular work, because suddenly applied loads will be picked up gradually, without shock or destructive action in the members of the apparatus. The drivers D¹ and rollers R will have life dependent upon the shearing strength with which they resist surface abrasion. These qualities are found in highest degree in hardened alloy steel. The resilient S will have life dependent upon its elastic resistance to shearing. This quality is found in highest degree in spring tempered alloy steel.

The elastic action of the resilient S and its capacity to be considerably strained and distorted by a moderate stress not only give a perfectly cushioned drive and pick-up of heavy and suddenly applied loads but also give the setting up apparatus P a stroke of such length as to make practicable, easy and precise the necessary adjustment of said setting-up apparatus to the desired speed and torque of drive, which adjustment would obviously be much more difficult and less precise, if not impossible, were I to use rigid members in lieu of elastic ones; for in that case the adjusting movement would be so short that nice graduation would be impossible.

I claim my herein described apparatus as a fundamentally new method of transmitting power, depending upon the law, of which I am the first to discover a practical use, that if an elastic body be locally strained and such local strains be forced to change their positions in said elastic body it resists the change of position of such local strain with a force proportional to their magnitude and this resistance reacts upon and drives the body to be driven. Preferably, a plurality of rolling members, adjustable as to their radial extension, lie and act between driving wheels and an elastic, hollow, cylindrical, enveloping member or "resilient" and by their pressures upon the latter induce shearing strain in its substance and in the operation of my apparatus said rolling members move orbitally about its axis and drive said strains in a like motion. The enveloping driven member or resilient resists the translation of said nodes of strains through its substance and if the load be light relatively to the total amount of such strains the driving and driven members may revolve substantially synchronously; while if it be heavy, it retards the enveloping member, and the rollers roll upon the latter and drive the nodes of strains through its substance, which reacts against the translation; and this reaction is communicated to and drives the body to be driven, with a speed and torque variable with the radial pressure and the load. Force is communicated from the driving wheels to the rollers by skin friction and the enveloping member opposes their rolling upon it by its internal reactions, as above described. The arm of the drive upon a roller is evidently its diameter, while the arm of the resistance to its rolling, offered by the enveloping member, evidently depends upon the amount of deformation of the latter and is relatively very short, it may be infinitesimally short; and it is therefore evident that a small unit of force per revolution of the drivers may cause a many times greater force, at a correspondingly slow speed, in the enveloping member. The load that can be moved evidently depends upon the degree of distortion and reactions of the enveloping member and if these be sufficient in amount to move the load, the apparatus will automatically adjust the torque and speed of the enveloping member to the driving power and the load and the drive will be very economical; while if they are not sufficiently great the apparatus will be stalled, and all the power will be wasted, and it will be necessary to manually adjust the radial extension of the rollers and the distortion and strains in the enveloping member to the new load, in order to move it, and to adjust the rate of power supply, in order to drive it at a desired speed. On the other hand, if the rate of power supply and the distortion and strains in the enveloping member be too great, the apparatus will race and the rate of power supply and the distortion and strains in the enveloping member must be reduced in order to slow down.

My apparatus, if properly proportioned and used, is highly economical of power because in it the strains are driven in the desired direction of motion of the driven members whereas in all hitherto known types of power transmission apparatus by friction wheels or rollers, strains oppose the desired motion and are translated in the substance of the apparatus in a direction relatively contrary to the desired motion, they must be so translated before such apparatus can function and the power necessary to so translate them is entirely wasted.

What I claim as new and desire to protect by Letters Patent is:—

1. A power transmission mechanism apparatus comprising a revolving driving member and an elastic driven member located axially with the driving member, revoluble members mounted on the driving member and having rolling contact with the elastic driven member and means for controlling the power transmitted.

2. A power transmission mechanism apparatus comprising rolling driving members having an orbital motion about an axis, means for driving said rolling members, and an elastic driven member revoluble about the same axis, the rolling members being adapted to drive the elastic driven member by rolling contact.

3. A power transmission mechanism apparatus comprising rolling driving members having an orbital motion about an axis, means for driving said rolling members, an elastic driven member revoluble about the same axis and means for controlling the power transmitted, the rolling members being adapted to drive the elastic driven member by rolling contact.

4. A power transmission mechanism apparatus comprising an elastic driven member revoluble about an axis, rolling driving members having an orbital motion about the same axis and means for driving said rolling members, the rolling driving members being located interiorly to the elastic driven member and adapted to drive it by rolling contact.

5. A power transmission mechanism apparatus comprising an elastic driven member revoluble about an axis, rolling driving members having an orbital motion about the same axis, means for driving said rolling members and means for controlling the power transmitted, the rolling driving members being located interiorly to the elastic driven member and adapted to drive it by rolling contact.

6. A power transmission mechanism apparatus comprising floating rolling driving members having an orbital motion about an axis, means for driving said rolling driving members and an elastic driven member revoluble about the same axis, the rolling driving members being adapted to drive the elastic driven member by rolling contact.

7. A power transmission mechanism apparatus comprising floating rolling driving members having an orbital motion about an axis, means for driving said rolling, driving members, an elastic driven member revoluble about the same axis and means for controlling the power transmitted, the rolling members being adapted to drive the elastic driven member by rolling contact.

8. A power transmission mechanism apparatus comprising rolling driving members having an orbital motion about an axis, means for driving said rolling driving members and an elastic proportionating driven member revoluble about the same axis, in the same direction the rolling members being adapted to cause local strains in and roll on and drive said strains around in the elastic driven member, and said driven member adapted to proportionate the speed of its own revolution to the resistance and the rate of power supply.

9. A power transmission mechanism apparatus comprising rolling driving members having an orbital motion about an axis, means for driving said rolling driving members, an elastic proportionating driven member revoluble about the same axis in the same direction and means for controlling the power transmitted, the rolling members being adapted to cause local strains in and roll on and drive said strains around in the elastic driven member, and said driven member adapted to proportionate the speed of its own revolution to the resistance and the rate of power supply.

10. A power transmission mechanism apparatus comprising a revoluble driving member, rolling members having an orbital motion about the driving member and an elastic revoluble driven member, the driving member being adapted to drive the rolling members and the rolling members adapted to drive the elastic driven member by rolling contact.

11. A power transmission mechanism apparatus comprising a revoluble driving member, rolling members having orbital motion about the driving member and an elastic revoluble driven member, the driving member being adapted to drive the rolling members and the rolling members adapted to drive the elastic driven member by rolling contact and means for controlling the power transmitted.

12. A power transmission mechanism apparatus comprising rolling driving members having an orbital motion about an axis, means for driving said rolling members, an elastic revoluble proportionating driven member enveloping said rolling members and means for increasing and decreasing the radial extension of said rolling members, said rolling members being adapted to cause strains in the elastic driven member variable proportionally to the radial extension of said rolling members, and to roll on and drive said strains around in said elastic driven members.

13. A power transmission apparatus adapted to transmit power by rolling contact and having two revolving driving members located on its axis, a circumferentially located revoluble elastic driven member, rolling members adapted to roll and transmit power between the axial driving members and the circumferential driven member and means for approaching and separating the axial driving members and thereby increasing and decreasing the pressure exerted between the members.

14. A power transmission apparatus adapted to transmit power by rolling contact and having two revolving driving members located in its axis, a circumferentially located elastic revoluble driven member, rolling members adapted to roll and transmit power between the axial driving members and the elastic driven member and means for approaching and separating the axial driving members and thereby increasing and decreasing the pressure exerted between the members.

15. In a power transmission apparatus adapted to transmit power by rolling contact the combination of two grooved, axially located, revolving driving members, a grooved circumferentially located revoluble driven member, rolling members with rounded edges adapted to engage with, roll and transmit power between the grooved driving and driven members and means for approaching and separating the axial driving members and thereby increasing and decreasing the pressure exerted between said members.

16. A power transmission mechanism apparatus comprising axial revoluble driving members, an elastic enveloping member revoluble about the same axis, rolling members floating and having an orbital motion between and in contact with said driving and enveloping driven members, means to maintain fixed intervals between said rolling members and means for increasing and decreasing the pressure exerted between said members.

17. In a power transmission apparatus adapted to transmit power by rolling contact the combination of axially and circumferentially located revolving driving and elastic driven members, rolling members adapted to roll and transmit power between the axial and circumferential members and formed with rims and axial studs substantially contained within the bounding planes of said rims, guide blocks on said studs, a ring formed with radial slots adapted to engage said guide blocks, substantially as set forth.

18. In a power transmission apparatus adapted to transmit power by rolling contact, the combination of axially and circumferentially located revolving driving and elastic driven members, rolling members adapted to roll and transmit power between the axial and circumferential members and formed with rims and axial studs substantially contained within the bounding planes of said rims, guide blocks pivoted on said studs, transverse trunnions on said guide blocks, a spacing ring, lugs on said ring, forming radial slots adapted to engage said guide blocks, said lugs being formed with circumferential slots and guide blocks on the aforesaid trunnions adapted to engage said circumferential slots, substantially as set forth.

19. In a power transmission apparatus adapted to transmit power by rolling contact the combination of axially located driving and driven shafts, a circumferentially located revoluble member, elastic members adapted to transfer power by rolling contact between one of said shafts and the circumferential member and a coiled spring circumferentially located and adapted to engage and transmit power between the circumferential member and the other shaft, substantially as set forth.

20. In a power transmission apparatus adapted to transmit power by rolling contact the combination of axially located driving and driven shafts, a circumferentially located, revoluble elastic member, members adapted to transmit power by rolling contact between one of said shafts and the circumferential member, a coiled spring circumferentially located, engagements formed on said member adapted to engage the convolutions of said spring and engagements connected with the other shaft and adapted to engage said spring, substantially as set forth.

21. A new article of manufacture, a substantially ring-shaped body having internal grooves and engaging teeth formed on one of its edges, adapted to receive power by rolling contact and transmit it to a shaft, substantially as set forth.

22. In a transmission apparatus, adapted to transmit power by rolling contact the combination of a shaft in male and female sections, axially movable relatively to one another, driving wheels on said shaft sections, a circumferentially located member, a set of rolling members between and adapted to transmit power between each of said driving wheels and the circumferential member, and means for approaching and separating the said driving wheels and thereby increasing and decreasing the pressure exerted between said members.

23. In a transmission apparatus adapted to transmit power by rolling contact the combination of a driving shaft in male and female sections axially movable relatively to one another, grooved driving wheels on each of said sections, a circumferentially located grooved revoluble member, a set of elastic members with rounded edges adapted to engage the grooves in and roll and transmit power between each of said driving wheels and the circumferentially located member, and means for approaching and separating said driving wheels and thereby increasing and decreasing the pressure between said members.

24. In a power transmission apparatus adapted to transmit power by rolling contact the combination of male and female sections of a driving shaft axially movable relatively to one another, driving wheels on said shaft sections, driving faces on the said wheels, a circumferentially located revoluble elastic member formed with driving faces, sets of members adapted to roll and transmit power between each pair of driving faces on the said wheels and said circumferential member, the driving faces and rolling members being so inclined relatively to one another that when the driving wheels are approached or separated the pressure between the members is increased or diminished and means for approaching and separating said driving wheels, substantially as set forth.

25. In a power transmission apparatus adapted to transmit power by rolling contact the combination of a driving shaft in male and female sections axially movable relatively to one another, driving wheels on said sections, driving grooves in said wheels, a circumferentially located revoluble elastic member formed with interior grooves, sets of members with rounded edges adapted to engage, roll and transmit power between a groove in a driving wheel and a groove in the circumferential member, the rolling members of one set inclined to the shaft axis, the rolling members of the other set oppositely inclined to the shaft axis and means for approaching and separating the driving wheels and changing the angle of inclination of the rolling members and thereby adjusting the pressure exerted by said members on one another.

26. In a power transmission apparatus adapted to transmit power by rolling contact the combination of a driving shaft in male and female sections axially movable relatively to one another, driving wheels on said shaft sections, a circumferentially located revoluble elastic member, sets of members adapted to roll and transmit power between each of said wheels and said circumferential member, said rolling members having a toggle action between the driving wheels and the circumferential member, means for approaching and separating the wheels and thereby increasing and decreasing the pressure exerted between said members, and a hand-operable member adapted to control said means and thereby to approach and separate said wheels and vary said pressure, substantially as set forth.

27. In a power transmission apparatus adapted to transmit power by rolling contact the combination of a driving shaft, male and female sections thereof axially movable, relatively to one another, driving wheels on said sections, a circumferentially located revoluble elastic member, sets of members adapted to roll and transmit power between each driving wheel and the circumferential member, power-operable apparatus adapted to approach and separate said wheels and vary the pressure exerted between said members, means on the driving shaft adapted to be connected with and disconnected from and to drive said power-operable apparatus and hand operable means adapted to be operated to connect and disconnect said means on the shaft and the said power-operable apparatus, and thereby to cause the driving wheels to be approached and separated and the pressure between said members increased and diminished, substantially as set forth.

28. In a power transmission apparatus adapted to transmit power by rolling contact, the combination of a driving shaft, male and female sections thereof, driving wheels on said sections, a circumferentially located revoluble member, sets of elastic members adapted to roll and transmit power between each of said wheels and the circumferential member, a screw thread formed on one movable shaft section, a nut revoluble on said screw and swiveled to the other movable shaft section and means for revolving said nut by the power of the driving shaft, substantially as set forth.

29. In a power transmission apparatus adapted to transmit power by rolling contact, the combination of a driving shaft, male and female sections thereof axially movable relatively to one another, a circumferentially located revoluble member, sets of elastic members adapted to roll and transmit power between each of said driving wheels and the circumferential member, a screw thread formed on one movable shaft member, a nut engaging said screw and swiveled on the other movable shaft member, a setting up wheel on the nut, a primary setting up wheel on the shaft, a setting-up train adapted to engage and be disengaged from the setting up wheels on the shaft and on the nut and a releasing wheel adapted to be engaged with and disengaged from the wheels on the nut and shaft and hand-operable means adapted to engage and disengage said setting-up train and said releasing wheel with and from said setting-up wheels and thereby cause the power of the driving shaft to approach or separate said driving wheels and increase or decrease the pressure between the transmission members, substantially as set forth.

30. In a power transmission apparatus adapted to transmit power by rolling contact, the combination of a driving shaft, male and female sections thereof axially movable relatively to one another, driving wheels on the shaft sections, a circumferentially located revoluble elastic member, sets of members adapted to roll and transmit power between each of said driving wheels and the circumferential member, a screw formed on a movable shaft section, a nut engaging therewith and swiveled on the other movable shaft section, differentiating spur gears one fixed on the nut the other on the shaft, a releasing spur gear adapted to engage and be disengaged from said differentiating gears, a differential setting-up train of spur gears adapted to engage and be disengaged from said differentiating gears on the nut and the shaft and hand-operable means for causing engagement and disengagement of the releasing and setting-up gears with the gears on the nut and the shaft and thereby to cause the power of the driving shaft to revolve the nut and approach and separate the driving wheels and vary the pressure between the transmission members, substantially as set forth.

31. In a power transmission apparatus adapted to transmit power by rolling contact, the combination of axial and circumferential revoluble driving and driven members, rolling members adapted to roll and transmit power between the driving and driven members and means for increasing and decreasing the operative or driving pressures between said members, said operative or driving pressures being entirely contained within the revoluble members.

32. In a power transmission apparatus the combination of a shaft in male and female sections adapted to be moved axially relatively to one another, a male shaft section on each side projecting beyond the female shaft section and each male shaft section connected with the female shaft section on the opposite side, substantially as set forth.

33. In a power transmission apparatus the combination of a shaft in male and female sections axially movable relatively to one another, the male shaft sections on each side projecting beyond the female sections, a head formed on one female section, a head formed on the male section of the opposite side and pins uniting the said male and female sections, heads formed on the other male and female sections and uniting means adapted to unite said male section and female section, and enveloping the connection of the other male and female sections, substantially as set forth.

34. In a power transmission apparatus a power shaft in two male and two female sections, and having at each end a male section enveloped in and extending outwardly beyond the outer end of a female section and the male section at each end rigidly connected and movable axially with the female section at the opposite end and means for moving the connected male and female sections axially.

35. In a power transmission apparatus a power shaft in two male and two female sections and having at each end a male section enveloped in and extending outwardly beyond the outer end of a female section and the male section at each end rigidly connected and axially movable with the female section at the opposite end, driving wheels on the end of each shaft section, a revoluble elastic member substantially enveloping the pair of driving wheels on a male and female section at each end and sets of rolling members, a set adapted to roll and transmit power between each driving wheel and one of the enveloping elastic members and means to move said shaft sections axially relatively to one another.

36. In a power transmission apparatus a power shaft in two male and two female sections and having at each end a male section enveloped in and extending outwardly beyond the outer end of a female section and the male section at each end rigidly connected and axially movable with the female section at the opposite end, a screw formed on one shaft section, a nut swiveled on an oppositely axially movable section and engaging said screw and means for rotating said nut relatively to said screw.

37. In a power transmission apparatus a power shaft in two male and two female sections and having at each end a male section enveloped in and extending outwardly beyond the outer end of a female section and the male section at each end rigidly connected and axially movable with the female section at the opposite end, a screw on one shaft section, a nut engaging said screw and swiveled on an oppositely axially movable shaft section, a gear wheel on the nut, a primary gear wheel on either section of the shaft, a releasing gear wheel adapted to be engaged with and disengaged from the primary gear and that on the nut to release the apparatus by traversing the connected male and female shaft sections axially, a setting-up train of gear wheels adapted to be engaged with and disengaged from the primary gear and that on the nut and shaft section and to set up the apparatus by axially traversing the connected male and female shaft sections oppositely to the releasing motion and hand-operable means adapted to cause the engagement and disengagement of the releasing gear and setting-up train with and from the primary gear and that on the nut.

38. In a power transmission apparatus a power shaft in two male and two female sections, and having at each end a male section enveloped in and extending outwardly beyond the outer end of a female section and the male section at each end rigidly connected with and axially movable with the female section at the opposite end, a screw on one shaft section, a nut engaging said screw and swiveled on an oppositely axially movable shaft section, a spur gear wheel on the nut, a primary gear wheel on either shaft section, a releasing spur gear wheel adapted to be engaged with and disengaged from the primary gear and that on the nut and when so engaged to release the apparatus by traversing the connected male and female shaft sections axially, a setting-up train of spur gear wheels adapted to be engaged with and disengaged from the primary gear and that on the nut and to set up the apparatus when so engaged by axially traversing the connected male and female shaft sections oppositely to the releasing motion and hand operated means adapted to cause the engagement and disengagement of the releasing and setting up spur gear wheels with and from the primary gear and that on the nut.

39. In a power transmission apparatus the combination of axially movable shaft sections, a screw on a shaft section, a revoluble nut engaging said screw and swiveled to an oppositely movable shaft section, a differentiating gearing consisting of a spur gear on the nut and a primary spur gear on the shaft, one of the said gears having fewer teeth than the other, a releasing gear adapted to engage and disengage from said differentiating gears and to release the mechanism, a setting-up train one gear wheel of which has fewer teeth than the other, said train being adapted to be engaged with and be disengaged from the aforesaid differentiating gears and to set up and release the mechanism and hand operable means adapted to cause the releasing gear and setting-up train, to be engaged with and disengaged from the gear wheels on the nut and on the shaft, substantially as set forth.

40. In a power transmission apparatus the combination of axially movable shaft sections, a screw on a shaft section, a revoluble nut engaging said screw and swiveled on an oppositely movable shaft section, a differentiating gearing consisting of a spur gear on the nut and either spur gear on the shaft, one having fewer teeth than the other, releasing spur gearing and setting-up spur gearing each adapted to engage and be disengaged from the differentiating gears and to revolve the nut relatively to the screw and a crank motion apparatus adapted to cause the engagement therewith and disengagement of the said releasing and setting-up gearings with the differentiating gears, substantially as set forth.

41. In a power transmission apparatus the combination of axially movable shaft sections, a screw on a shaft section, a revoluble nut engaging said screw and swiveled on an opposite movable shaft section, a differential gearing consisting of two spur wheels, one on the nut, one on a shaft section and one having more teeth than the other, releasing spur gearing and setting-up spur gearing each adapted to engage and be disengaged from the differential gearing by crank motion, a crank adapted to swing the releasing gear in and out of mesh with the differential gearing, a crank adapted to swing the setting-up gearing in and out of mesh, an operating crank located between the crank axes of the releasing and setting up gears, links connecting the operating crank with the releasing gear crank and with the setting-up gear crank, and hand-operable means adapted to operate the operating crank, substantially as set forth.

42. In a power transmission apparatus the combination of axially movable shaft sections a screw on a shaft section, a revoluble nut engaging said screw and swiveled to an oppositely movable shaft section, two differential spur wheels, one with fewer teeth than the other, one fixed on the nut and one fixed on either section of the shaft, a releasing spur gearing, a setting up spur gearing, a crank adapted to move the releasing gearing in and out of mesh with the differential gearing, a crank adapted to similarly move the setting up gearing, an operating crank located between the crank axes of the releasing and setting-up gearing, links connecting the operating crank with the releasing gear crank and the setting-up gear crank, a reciprocating control bar operably connected with and adapted to swing the operating crank and thereby to swing the releasing and setting-up gearings in and out of mesh and hand-operable means, operably connected with said control bar, whereby it can be reciprocated, substantially as set forth.

43. In a power transmission apparatus the combination of axially movable shaft sections, a screw on a shaft section, a revoluble nut engaging said screw and swiveled on an oppositely movable shaft section, means for revolving said nut relatively to said screw and thereby axially traversing said shaft sections and throw-out means, adapted to be operably connected with said shaft sections whereby a predetermined relative movement of the shaft sections will operate the throw-out and discontinue the action of the nut-operating means, substantially as set forth.

44. In a power transmission apparatus the combination of axially movable shaft sections, a wheel formed with friction surfaces on each and a screw thread formed on one shaft section, a nut engaging said screw and swiveled on an oppositely movable shaft section, engageable and disengageable means for operatingly revolving said nut relatively to said screw, a control bar operatingly connected with and adapted to cause the engagement and disengagement of said means, friction wheels revoluble on an axis parallel with the shaft, one containing a nut, the other a slide engagement, a traversing rod formed with a screw and a slide engagement respectively engaging said nut and slide engagement of said last-mentioned wheels, and a toggle apparatus operably connecting said traversing rod and said control bar and adapted to move it from operative to non-operative position.

45. In a power transmission apparatus the combination of axially movable shaft sections, a wheel formed with friction surfaces on each and a screw thread formed on one shaft section, a nut engaging said screw and swiveled on an oppositely movable shaft section, engageable and disengageable means for operatingly revolving said nut relatively to the screw, a control bar operatingly connected with and adapted to cause the engagement and disengagement of said means, wheels revoluble on an axis parallel with the shaft and having differentiating friction surfaces formed on their bodies and adapted to be operated by the friction surfaces on the shaft sections when they have reached a limit of their opposite axial motions, one of said last-mentioned wheels containing a nut, the other a slide-engagement, a traversing rod formed with a screw and a sliding engagement respectively engaging the nut and the slide engagement of said last-mentioned wheels, trunnion blocks on said traversing rod and a tappet thereon adapted to engage and move said trunnion blocks, a toggle formed of a pivoted lever and a link operably connecting it with said trunnion blocks, a toggle operably connected with said control bar and a link connecting the last-named with the lever of the first-named toggle, the last-named toggle comprising a link pivoted on a relatively fixed point and a link pivotally connecting the last-named link with said control bar and adapted to be substantially perpendicular and inoperative relatively thereto when said bar is at the middle point of its stroke and said means for revolving said nut connected with a shaft section is disengaged; and to be inclined and operative relatively to said control bar when it is at either limit of its stroke and said means is engaged to revolve said nut.

46. In a power transmission apparatus the combination of axially, oppositely movable shaft sections each formed with friction surfaces, engageable and disengageable means for giving opposite axial movements to said shaft sections, a throw-out mechanism adapted to disengage the aforesaid means when said shaft sections reach a limit of their opposite relative movements, wheels revoluble on an axis parallel with the shaft and formed with friction surfaces adapted to coact with said friction surfaces of said shaft sections to operate said throw-out mechanism, a control bar operably connected with the aforesaid means and adapted to engage it, to cause movement of said shaft sections when said control bars is at either limit of its stroke and to disengage said means when at the middle of its stroke, said control bar operably connected with said throw-out mechanism and returnable by the operation thereof from either stroke-limit to its mid-stroke, a swivel on each of said wheels one containing a nut, the other formed with a screw thread engaged with said nut, means to prevent rotation of one of said swivels, a wheel segment on the other swivel and meshed therewith a rack on said control bar.

47. In a power transmission apparatus the combination of oppositely axially movable shaft sections, engageable and disengageable means for so moving said shaft sections, a reciprocating control bar operably connected with said means, a rod swiveled on an end of said bar and formed with a screw thread and a slide engagement, a wheel segment formed with a nut engaging said screw, a wheel segment formed with a sliding engagement engaging said engagement of said rod, a hand-operable lever formed with a crank head and oppositely-set crank pins, and gearing connecting each of said pins with one of said wheel segments.

48. In a power transmission apparatus the combination of an axially movable control bar, a rod swiveled on said bar and formed with a screw thread and a slide engagement, a wheel segment having a nut engaging said screw, a wheel segment formed with a sliding engagement engaging said engagement of said rod, wheel segments one engaging each of the first-named segments, a crank head having opposite crank pins, links each connecting one of said crank-pins with an arm of one of the second-described segments, and a hand-operable lever connected with said crank-head.

49. In a power transmission apparatus a reciprocating control bar, a rod swiveled on an end thereof and formed with a screw thread and a slide engagement, a wheel segment containing a nut engaging said screw, a wheel segment formed with a sliding engagement corresponding and engaging with the slide engagement of said rod, wheel segments each engaging one of the aforesaid segments, a case formed with an end opening adapted for entering said wheel segments, a tubular portion thereof adapted to inclose the first-described wheel segments, a pocket formed on one side thereof adapted to contain the second-described wheel segments, spindles secured to said segments and outwardly-extending arms connected thereto.

50. In a power transmission apparatus the combination of axially movable revolving driving members with friction wheel surfaces, transmission members operably connected with the driving members, adjusting mechanism adapted to adjust the drive of said members, engageable and disengageable setting up and releasing mechanism adapted to operate the adjusting mechanism and set up and release the driving members to adjust the drive, hand-operable control apparatus adapted to cause the engagement and disengagement of said setting up and releasing mechanism, throw-out mechanism having friction wheel surfaces corresponding with and adapted to be operated by the friction surfaces on the axially movable revolving members at limits of their stroke to disengage the setting up and releasing mechanism, friction surfaces on the axially movable revolving drive members, points of engagement with the friction surfaces on the drive members and an operable connection between said means and the hand operable control apparatus, whereby motions of the said control apparatus will operate said means to position the friction surfaces of the throw-out mechanism, substantially as set forth.

51. Power transmission apparatus adapted to transmit power by rolling contact and comprising a driving member, an elastic, proportionating driven member, and rollers between the driving and driven members; all said members moving in the same direction, said rollers adapted to be driven by the driving members, and strain and roll on the driven member, and said driven member adapted, by its resistance to the translation of such strains through its substance, to proportionate its speed to the load and the rate of power delivery.

In testimony whereof, I affix my signature in presence of two witnesses.

CHAUNCEY N. DUTTON.

Witnesses:
 ELIZABETH DUTTON,
 ANNA DUTTON.